(12) United States Patent
Morris et al.

(10) Patent No.: US 11,240,468 B2
(45) Date of Patent: Feb. 1, 2022

(54) VIDEO CONFERENCING DURING REAL TIME COLLABORATION ON A VIRTUAL CANVAS

(71) Applicant: T1V, INC., Charlotte, NC (US)

(72) Inventors: James E. Morris, Lake Wylie, NC (US); Michael R. Feldman, Charlotte, NC (US)

(73) Assignee: T1V, INC., Charlotte, NC (US)

( * ) Notice: Subject to any disclaimer, the term of this patent is extended or adjusted under 35 U.S.C. 154(b) by 0 days.

(21) Appl. No.: 17/111,547

(22) Filed: Dec. 4, 2020

(65) Prior Publication Data

US 2021/0120208 A1 Apr. 22, 2021

Related U.S. Application Data

(63) Continuation of application No. PCT/US2019/035620, filed on Jun. 5, 2019.
(Continued)

(51) Int. Cl.
*H04N 7/15* (2006.01)
*G06F 3/0484* (2013.01)
(Continued)

(52) U.S. Cl.
CPC ........... *H04N 7/15* (2013.01); *G06F 3/04845* (2013.01); *G06F 3/1454* (2013.01); *H04L 67/141* (2013.01); *H04N 7/147* (2013.01); *H04N 21/2187* (2013.01); *G06F 3/04842* (2013.01); *H04N 7/142* (2013.01); *H04N 2007/145* (2013.01)

(58) Field of Classification Search
CPC ........ H04N 7/15; H04N 7/14; H04N 21/2187; G06F 3/14; G06F 3/0484; H04L 29/08
USPC ............................................. 348/14.01–14.16
See application file for complete search history.

(56) References Cited

U.S. PATENT DOCUMENTS 9,086,837 B1 * 7/2015 Kang ...................... G06F 3/016
2010/0306004 A1 12/2010 Burtner et al.
(Continued)

OTHER PUBLICATIONS

International Search Report and Written Opinion dated Sep. 27, 2019, received for PCT Application No. PCT/US2019/035620, Filed on Jun. 5, 2019, 13 pages.
(Continued)

*Primary Examiner* — Melur Ramakrishnaiah
(74) *Attorney, Agent, or Firm* — Xsensus LLP

(57) ABSTRACT

A method of collaborating between a first computer associated with a first display at a first location and a second computer associated with a second display at a second location may include establishing a connection between the first and second computers, opening a virtual canvas on the first computer, the virtual canvas to be displayed on the first and second displays simultaneously, and sending an object between the first and second computers by sending data associated with the object on the virtual canvas stored on the first computer to the second computer to be stored locally, thereby creating a shared canvas on which objects are at a single location. Video conferencing may include sending a first live video stream from the first display to the second display to be viewed in a first video conference window separate from the virtual canvas on the second display and vice versa.

22 Claims, 30 Drawing Sheets

Related U.S. Application Data

(60) Provisional application No. 62/680,903, filed on Jun. 5, 2018.

(51) Int. Cl.
    *G06F 3/14*     (2006.01)
    *H04L 29/08*     (2006.01)
    *H04N 7/14*     (2006.01)
    *H04N 21/2187*     (2011.01)

(56) References Cited

U.S. PATENT DOCUMENTS

| | | | |
|---|---|---|---|
| 2010/0328423 A1* | 12/2010 | Etter | H04N 7/142 |
| | | | 348/14.16 |
| 2011/0252092 A1* | 10/2011 | Amemura | H04L 12/1818 |
| | | | 709/204 |
| 2012/0117156 A1 | 5/2012 | Anka | |
| 2016/0004759 A1 | 1/2016 | Ramakrishnan et al. | |
| 2016/0119388 A1 | 4/2016 | Sitrick et al. | |
| 2017/0127276 A1* | 5/2017 | Koo | H04W 12/068 |
| 2017/0195631 A1* | 7/2017 | Cahill | H04N 7/15 |
| 2017/0251238 A1 | 8/2017 | Feldman et al. | |
| 2017/0324572 A1* | 11/2017 | Biggs | H04L 29/08 |
| 2018/0052840 A1* | 2/2018 | Scott | G06F 16/44 |
| 2018/0160072 A1* | 6/2018 | Cranfill | G06F 3/0482 |

OTHER PUBLICATIONS

Kishore, "6 Free Online Screen Sharing Tools." In: Online Tech Tips, Jun. 6, 2013, pp. 1-9.

\* cited by examiner

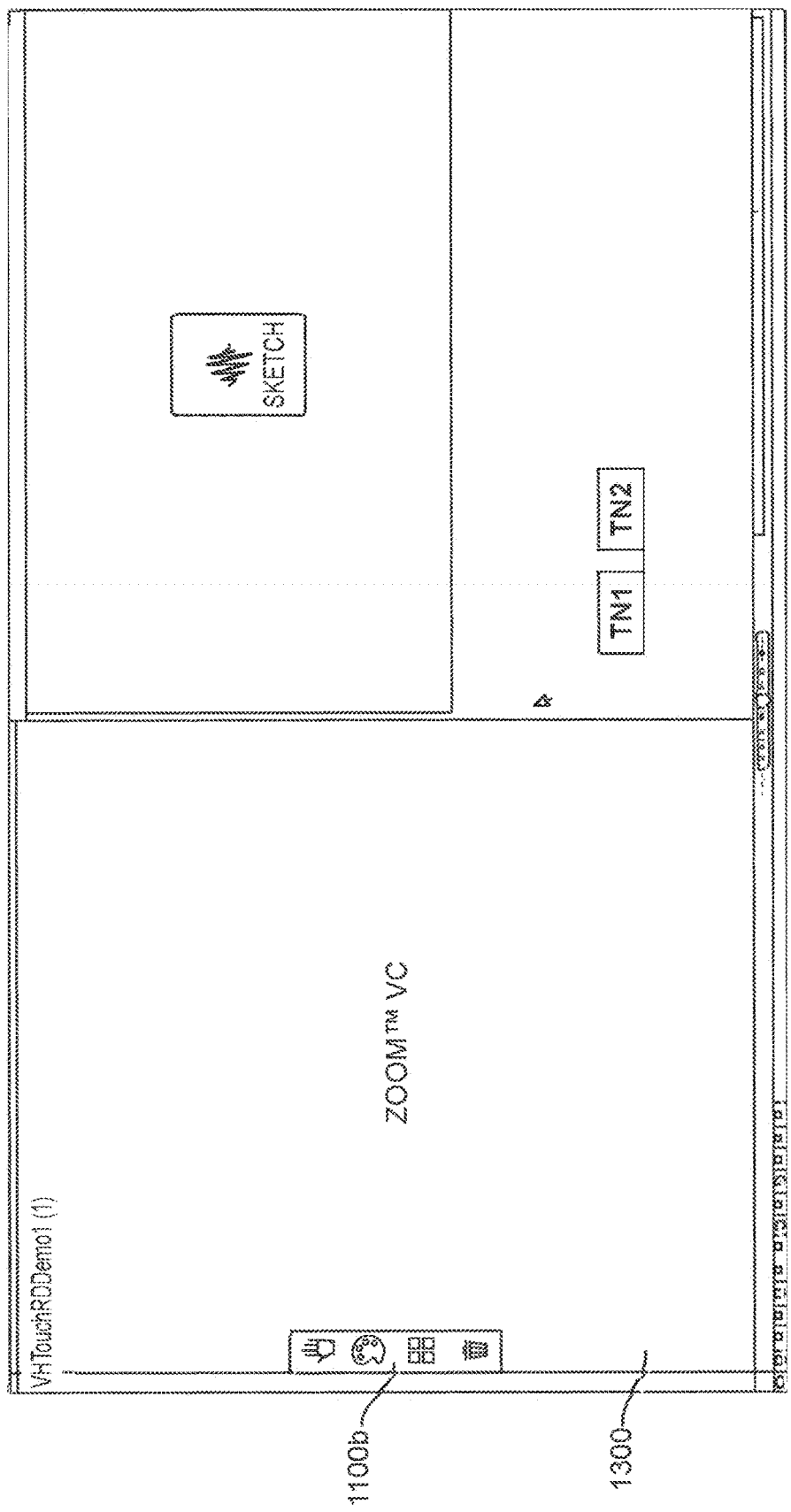

US 11,240,468 B2

VIDEO CONFERENCING DURING REAL TIME COLLABORATION ON A VIRTUAL CANVAS

CROSS-REFERENCE TO RELATED APPLICATIONS

The present application is a continuation of PCT filing PCT/US2019/035620, filed Jun. 5, 2019, which claims priority to U.S. Provisional Application No. 62/680,903 filed Jun. 5, 2018, and entitled: "Video Conferencing During Real Time Collaboration on a Virtual Canvas," each of which are incorporated herein by reference in their entirety.

DESCRIPTION OF RELATED ART

There are currently different solutions to collaborating over multiple locations. Web-based conferencing mirrors an entire screen of a first computer to the screen of other computers. The web-based conferencing software allows any of the computers connected to be the "presenter." All of the other users connected can view the presenter's screen on their computer. However, there is the limitation that there is only one presenter who is mirroring their display at a time. The computer of the presenter sends the whole screen to the other computers at a refresh rate, i.e., streams the entire screen to a screen at another location.

Cloud based collaboration tools host a session on a cloud server and provide a link that client computers use to log in to the session on the cloud server. Multiple documents can be uploaded into the canvas of session on the cloud server and then viewed and/or downloaded by any client computers connected to the session. Each location in a session can then use an application to edit a document or file in the session directly on the cloud server. While more than one location may edit the content in the session at a time, when something is being changed on a screen at one location, the computer at that location waits until the action is finished and then sends the information to the cloud server. A host session can open a canvas that is much larger than an individual screen. Each user at each location that joins the session can edit documents on the canvas.

For example, a user can perform a move or resize gesture on a window. After the gesture is complete, then the new size or location of the window is sent to the cloud server and the window is updated and sent to all locations. If an annotation, e.g., a line or circle, is drawn, once completed, i.e., a finger or stylus is lifted from the display, then this info is sent to the cloud server and the drawn image is stored on the canvas on the cloud server. For example, if a user at one location has a powerpoint file that they would like to share, they first upload the powerpoint file to the cloud. Then all of the slides in the powerpoint file are converted to a useable file format, stored in the cloud, and are then available for viewing from other locations. While everything is accessible in the cloud at any time in different time zones, e.g., asynchronous collaboration, when real time collaboration is desired, this may not be sufficient. Further, while these solutions may function well for many file types, live video feeds are not handled by this solution.

SUMMARY

One or more embodiments are directed to a method of collaborating between a first computer associated with a first display at a first location and a second computer associated with a second display at a second location. The method may include establishing a connection between the first and second computers, opening a virtual canvas on the first computer, the virtual canvas to be displayed on the first and second displays simultaneously, and sending an object between the first and second computers by sending data associated with the object on the virtual canvas stored on the first computer from the first computer to the second computer to be stored locally, thereby creating a shared canvas, wherein objects are at a single location on the shared canvas, sending a first live video stream from the first display to the second display to be viewed in a first video conference window separate from the virtual canvas on the second display, and sending a second live video stream from the second display to the first display to be viewed in a second video conference window separate from the virtual canvas on the first display.

The method may further include connecting a mobile display device to one of the first and second computers, sending a rendering of the shared canvas, and directly sending the first and second live video streams in a video conference window on the mobile display device separate from the rendering.

Each of the first and second video conference windows is in a video conferencing panel.

The method may further include selecting a video conference window and altering the selected video conference window.

Altering the selected video conference window may include moving the selected video conference window to be adjacent a camera on a display viewing the window.

Altering the selected video conference window may include enlarging the window.

Selecting the video conference window may include detecting an audio signal associated with the video conference window.

The video conferencing panel may be stationary and the at least two video conference windows may be manipulatable.

The first and second video conference windows may be stationary, and the shared canvas and objects thereon may be manipulatable.

Each of the first and second video conference windows may be adjacent a camera associated with a display on which respective video conference windows are viewed.

The video conference window may be in a periphery of a display on which respective video conference windows are viewed.

The connection for the virtual canvas may provide information needed to send the first and second live video streams.

The connection for the virtual canvas may provide information to send to the first and second live video streams.

The virtual canvas may be stored in the cloud and the first and second live video streams may be transmitted in real-time.

The virtual canvas may be a restricted virtual canvas or an unrestricted virtual canvas.

The first live video stream may be displayed in the second video conference window separate from the virtual canvas on the first display, and the second live video stream may be displayed in the first video conference window separate from the virtual canvas on the second display.

One or more embodiment may be directed to a method of collaborating between first and second mobile devices having sharing application downloaded thereon and a host computer, the second mobile device being remote from the first mobile device and the host computer. The method may include establishing a peer-to-peer connection between the first and second mobile devices and the host computer, opening a virtual canvas on the host computer having a host display, the virtual canvas to be shared by the first and second mobile devices and the host display, sending a first object from the first mobile device to the virtual canvas by sending data associated with the first object to the host computer and sending the first object to the second mobile device by sending data associated with the first object from the host computer to the second mobile device, sending a first live video stream from the first mobile device to the host device to be viewed in a first video conference window separate from the virtual canvas on the host display, and sending a second live video stream from the second mobile device to the first mobile device to be the host device to be viewed in a second video conference window separate from the virtual canvas on the host display.

The virtual canvas may be stored in the cloud.

Collaboration may include a second host computer having a second host display located near the second mobile device, the method further including establishing a peer-to-peer connection between the host computer and the second host computer, wherein the virtual canvas to be displayed on the first and second displays simultaneously, and displaying the first and second live video streams on the second host display in first and second windows separate from the virtual canvas.

Sending the first and second live video streams may include using user accounts associated with the first and second mobile devices.

Establishing the peer-to-peer connection may include generating a key by the host device, reading the key by the first mobile device, sending the key to the second mobile device, and entering the key into the second mobile device.

One or more embodiments is directed to a method of collaborating between a first computer associated with a first display at a first location and a second computer associated with a second display at a second location. The method may included establishing a connection between the first and second computers, opening a virtual canvas on the first computer, the virtual canvas to be displayed on the first and second displays simultaneously, and sending an object between the first and second computers by sending data associated with the object on the virtual canvas stored on the first computer from the first computer to the second computer to be stored locally, thereby creating a shared canvas, wherein objects are at a single location on the shared canvas, sending a first live video stream from the first display to the second display to be viewed in a first video conference window on the second display, and sending a second live video stream from the second display to the first display to be viewed in a second video conference window on the first display, wherein at least one of the first and second video conference windows is not on the virtual canvas.

One or more embodiments is directed to a collaboration system, including a group display and a group display computer, the group display computer to provide a single display window at full screen or multiple display windows, the multiple display windows being in a fixed layout on the group display, wherein the group display computer is to receive mobile device data streams from at least two mobile devices running collaboration software over a wireless access protocol and to output display data streamed from both of the at least two mobile devices in separate display windows of the multiple display windows, the group display computer to further indicate the presence of additional display windows that are not displayed on the group display, all display windows being on a virtual canvas.

Annotations performed on the mobile device appear on the group display and annotations performed on the group display appear on both of the at least two mobile devices.

The fixed layout may include x rows and y columns, wherein x and y are both equal to or greater than two, one of x and y is fixed, and another of x and y is not fixed.

Each window can contain a mobile device stream, a white board, a video conference stream, and a snapshot of a stream.

The fixed layout may include four equally sized display windows.

The multiple display windows may be interchangeable.

When a snapshot of one of the at least two windows is taken, the snapshot is displayed in another one of the multiple display windows.

Selecting an icon may switch between the single display window and the multiple display windows.

The group display and the group display computer may identify mobile devices within connection range running collaboration software and to display an indication thereof on the group display, and, when the indication is activated, automatically connect to an associated mobile device to receive data streams therefrom over a wireless access protocol and to output display data streamed therefrom to the single display window at full screen or in a display window of the multiple display windows.

The indication may include a meeting calendar listing mobile devices associated with all invitees.

A collaboration system may include a video conferencing panel, separate from the virtual canvas, on which video conference windows are displayed during video conferencing.

One or more embodiments are directed to a collaboration system, including a group display and a group display computer, the group display computer to receive mobile device data streams from at least two mobile devices over a wireless access protocol and to output display data streamed from both of the at least two mobile in separate windows of multiple display windows having a fixed configuration, the group display including a video conferencing panel including different video conferencing applications to be selected, the video conferencing panel only permitting video conferencing, screen sharing, and annotation.

The group display may display an icon that, when activated, opens the video conferencing panel that is otherwise hidden.

Selection of a video conferencing application in the video conferencing panel starts a video conference.

The video conference window may be in one of the multiple display windows.

The video conferencing window may be in the video conferencing panel separate from the multiple display windows.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

Embodiments are directed to using video conferencing stream with a canvas such that the canvas may be manipulated without affecting the video conferencing stream. A Canvas is a virtual region that expands to greater than the physical area of a display region of a display, e.g., any number of times the physical area up to infinite. The use of the Canvas allows additional files to be accessible and can be saved, but off the display region. Further discussion of the canvas may be found in U.S. Pat. No. 9,596,319, which is hereby incorporated by reference in its entirety for all purposes. Gestures, such as pan, zoom and pinch gestures can be made to move and resize the scale of the Canvas, allowing the full canvas to be displayed at once or only a small section thereof.

In previous disclosures, a video conferencing stream occupied a window on the canvas. Therefore, when the canvas was manipulated, the video conferencing stream may be affected, e.g., may disappear altogether from the display region. However, users may want the video conferencing stream, e.g., a live video feed of a remote user, to remain on the display region, e.g., at a same position on the display region, at all times. Therefore, according to embodiments set forth below, a live video feed may be treated differently than other windows on the canvas.

Figure 1:
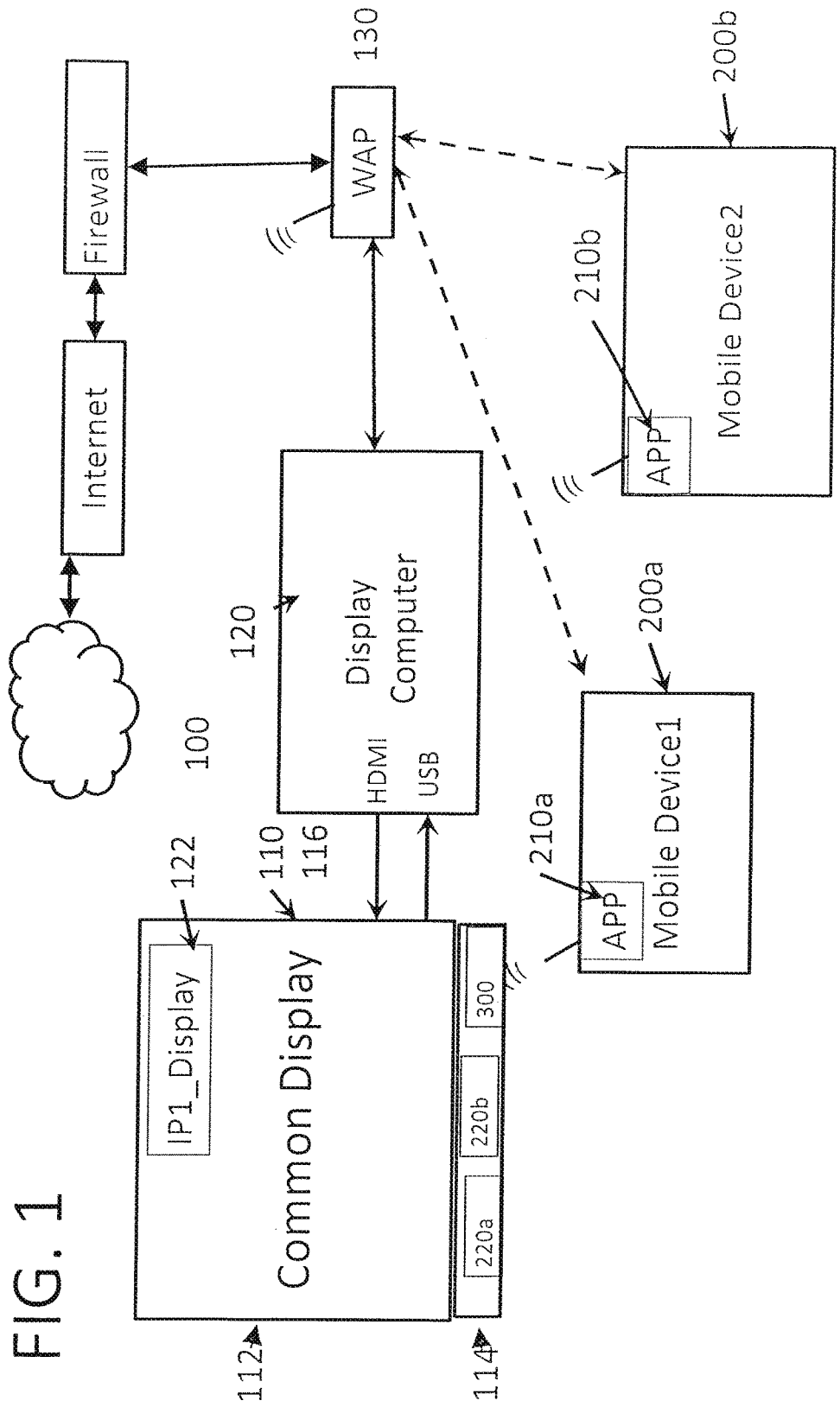
FIGS. 1 to 8 illustrate a display system in accordance with a first embodiment.

First, FIG. 1 will provide a brief overview of the Canvas used at a single location. FIG. 1 illustrates a block diagram of a display system 100 interacting with one or more mobile devices 200a, 200b, and so forth. The display system 100 includes a Common Display 110, a Display Computer 120, and a wireless router 130 serving as a wireless access point (WAP), all interconnected. The Common Display 110 may be an LCD display, LED display, or other monitor that is capable of having an electronic video signal as an input and converting the input to a visual image.

The Common Display 110 may include a display region 112 and a tray region 114, e.g., below the display region. The Common Display 110 a touch sensor 116, e.g., overlaying an entirety of the Common Display 110, that it is sensitive to touch inputs including taps and gestures.

Information regarding a Machine Identifier 122 of the Display Computer 120 and the digital information to be displayed on the Common Display 110 may be sent from the Display Computer 120 to the Common Display 110. This digital information can be within windows or Mobile Device Windows (MDWs), e.g., editable windows, or on the entire screen of display region 112 of the Common Display 110. In addition, there may be windows displaying contents from mobile devices (MD) or other appropriate mobile device icons (MDI) 220a, 220b, e.g., a thumbnail of what is displayed on the mobile device, in the tray region 114 on the Common Display 110, e.g., at a lower region thereof. The tray region 114 may be a region on which the MDWs cannot be zoomed and pinched, annotated, and so forth, but may be dragged, tapped or tossed onto the display region 112, e.g., to open an MDW corresponding to the MDI, and/or to receive MDWs from the display region 112 to transmit that MDW to the mobile device corresponding to the MDI. The tray region 114 may also include any graphical user interface (GUI) icons to be used on the Common Display 110. Further, selecting a MDW on the canvas may bring up one or more additional GUIs.

To connect to the Display Computer 120, a user of a mobile device may download a display application 210a, 210b thereon to assist in connecting the to the display computer 120. Such an application may be written for each common operating system and is herein referred to as an AirConnect™ App. Instructions for downloading the AirConnect™ App may be readily viewable, e.g., on or adjacent the common display 110, or a region to be scanned, e.g., a bar code, quick response (QR) code, and so forth, using a mobile device QR, so that once scanned, the AirConnect™ App could be downloaded. Once the AirConnect™ App is downloaded, then a user can launch the AirConnect™ App and then enter the Machine Identifier 122 associated common display 110. The Machine Identifier 122 may by an IP address or other alphanumeric code associated with the Display Computer 120. The Machine Identifier 122 may be simply displayed on the Common Display 110, in which case the user of the AirConnect™ App may simply enter the Machine Identifier 122 when prompted by the AirConnect™ App on their Mobile Device. Alternatively, the Machine Identifier 122 may be automatically transferred to the Mobile Device either by displaying a QR code on the Common Display 110 or by transmitting through bluetooth or wireless communication.

A virtual canvas (Canvas) that exists within the software on the Display Computer 120 may be much larger than the physical display region 112 on the Common Display 110. Any section of the Canvas can be viewed on the display region 112. Suppose that at first the entire Canvas is viewed on the display region 112. Then by zooming into regions, a portion of the Canvas can be viewed. By pinching, zooming and panning with gestures on the touch sensor 116, a user can zoom into various regions of the Canvas to be shown on the display region 112. The system can be configured so that the MDW can be moved and manipulated. For example, if the Common Display 110 includes the touch sensor 116, then touch gestures such as pan, zoom and pinch may be used to move and/or resize the MDWs. Snapshots of the MDWs can be taken from the Common Display, with the use of touch gestures. Annotations could be performed on the MDWs. Further details may be found, e.g., in U.S. patent application Ser. No. 14/540,946.

Figure 2:
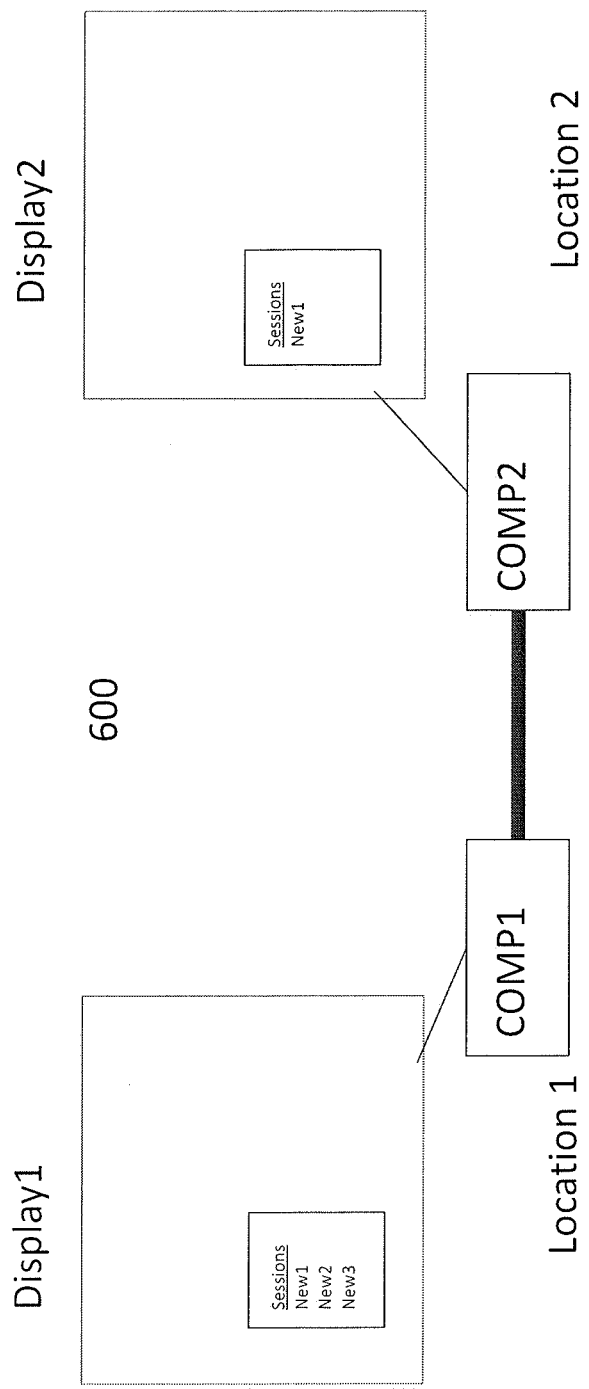

Now, a brief overview of the Canvas as used in multiple locations. As illustrated in FIG. 2, when operating at multiple locations, here illustrated as two for simplicity, when the screen on the displays is treated as a Virtual Canvas, rather than an entire screen, as disclosed, for example, in U.S. Pat. No. 9,596,319, issued on Mar. 14, 2017, which is hereby incorporated by reference for all purposes, individual objects or windows on the Virtual Canvas on a display Display1 410 at a first location Location 1 running on a first computer COMP1 420 may be transferred to a second computer COMP2 520 associated with a display Display2 510 at a second location Location 2 to be displayed on a Virtual Canvas on the display Display2 510, and vice versa. Instead of storing the objects or windows in the cloud, a shared canvas may be established to be accessed by both computers COMP1 420 and COMP2 520 running the displays using the Virtual Canvas software noted below and the objects can be transferred directly, e.g., using a peer-to-peer connection. This peer-to-peer connection may be established through a relay server, e.g., in the cloud, which does not store anything, but just relays that data or the connection maybe direct peer-to-peer without going through a relay server.

As used herein, peer-to-peer connection means that the computers forming the peer-to-peer connection communicate with each other, either directly or through a relay server. When a relay server is used, the relay server just relays data in real time to facilitate communication, but does not rely on storing data to transfer information. In contrast, in cloud-based communication protocol, each local computer communicates information to a cloud-based server. The cloud-based server has the master information or the master canvas and all objects on the master canvas. Periodically, each local computer requests from the cloud server if any changes have been made to the master canvas and if so, a synchronization occurs between the local computer and the cloud server.

In accordance with embodiments, initially a virtual session is started at a first location, with a computer, e.g., Comp1 420 or Comp2 520, that is running Virtual Canvas software, e.g., ThinkHub® multisite software by TIV®. In particular, aVirtual Canvas that exists within the software that may be much larger than the physical display region 412, 512 on Display1 410, 510. Any section of the Virtual Canvas can be viewed on the display region 412, 512 of the Display1 410, 510. Suppose that at first the entire Virtual Canvasis viewed on the display region 412, 512 and that each of the displays 410, 510 include a touch or gesture sensor 416, 516 associated therewith. Then by zooming into regions, a portion of the Virtual Canvas can be viewed. By pinching, zooming and panning with gestures detected by the touch sensor 416, 516, a user can zoom into various regions of the Virtual Canvas to be shown on the display region 412, 512.

The Virtual Canvas, is a virtual region that expands to greater than the physical area of the display regions 412, 512, e.g., any number of times the physical area up to infinite. The use of the Virtual Canvas allows additional files to be accessible and can be saved, but off the display regions 412, 512. Gestures, such as pan, zoom and pinch gestures can be made to move and resize the scale of the Virtual Canvas, allowing the full Virtual Canvas to be displayed at once or only a small section thereof.

After connection is established, then a user, e.g., at Comp1 420 starts a Multisite session and gives it a name, e.g., New1, as may be seen in a window 418 on Display1 410. Then, a user at a second location with a computer, e.g., Comp 2 520, that is also running the Virtual Canvas, software can see a list of active Multisite sessions that it has permission to access, e.g., New1 as shown in window 518 on Display2 510. Then, the user at the second location taps on a button or on the name in the list on the Virtual Canvas, to join the session. Once the second computer joins the session, the connection is established between Comp1 and Comp2, and the data for all the objects on Comp1 in the Virtual Canvas is then sent to Comp 2, and vice versa, such that the Virtual Canvas is now a shared canvas.

While the above has shown the displays displaying the objects at the same locations on the two displays, this is true if the displays are both displaying the same views of the Virtual Canvas. In other words, the objects are at the same location on the Virtual Canvas, different views of the Virtual Canvas, may be viewed on the different displays. For example, if Display 2 were viewing the same general region of the Virtual Canvas, but with a different zoom factor and slightly different center point, then on Display 2 W1 and W2 would appear on the same places on the Virtual Canvas, but different location on the Display and with different scale factors. Further, one display may be viewing a different portion of the shared canvas without altering the view on the other display. Alternatively, changing a portions being viewed on one display may alter that view on the other display.

As each object is stored locally, when an action is performed on that object, e.g., annotation, resizing, moving, and so forth, only that data regarding the change is sent from the computer associated with the display on which the change has been made to the other computer(s) viewing that object. This allows very fast performance once the object has been initially stored, as only the changed data is communicated. Further, this allows the change to be illustrated in real time, e.g., the remote display will show the zoom or pinch rather than abruptly change the size or will show the annotation as it is being drawn, rather than once a line or character is completed.

As noted above before this discussion of how mobile devices interact with Canvas, whether collocated or at one or more different locations, when the Canvas was manipulated, the video conferencing stream may be affected, e.g., may disappear altogether from the display region. However, users may want the video conferencing stream, e.g., a live video feed of a remote user, to remain on the display region, e.g., at a same position on the display region, at all times. Therefore, according to embodiments set forth below, a live video feed may be treated differently than other windows on the canvas.

Figure 3:
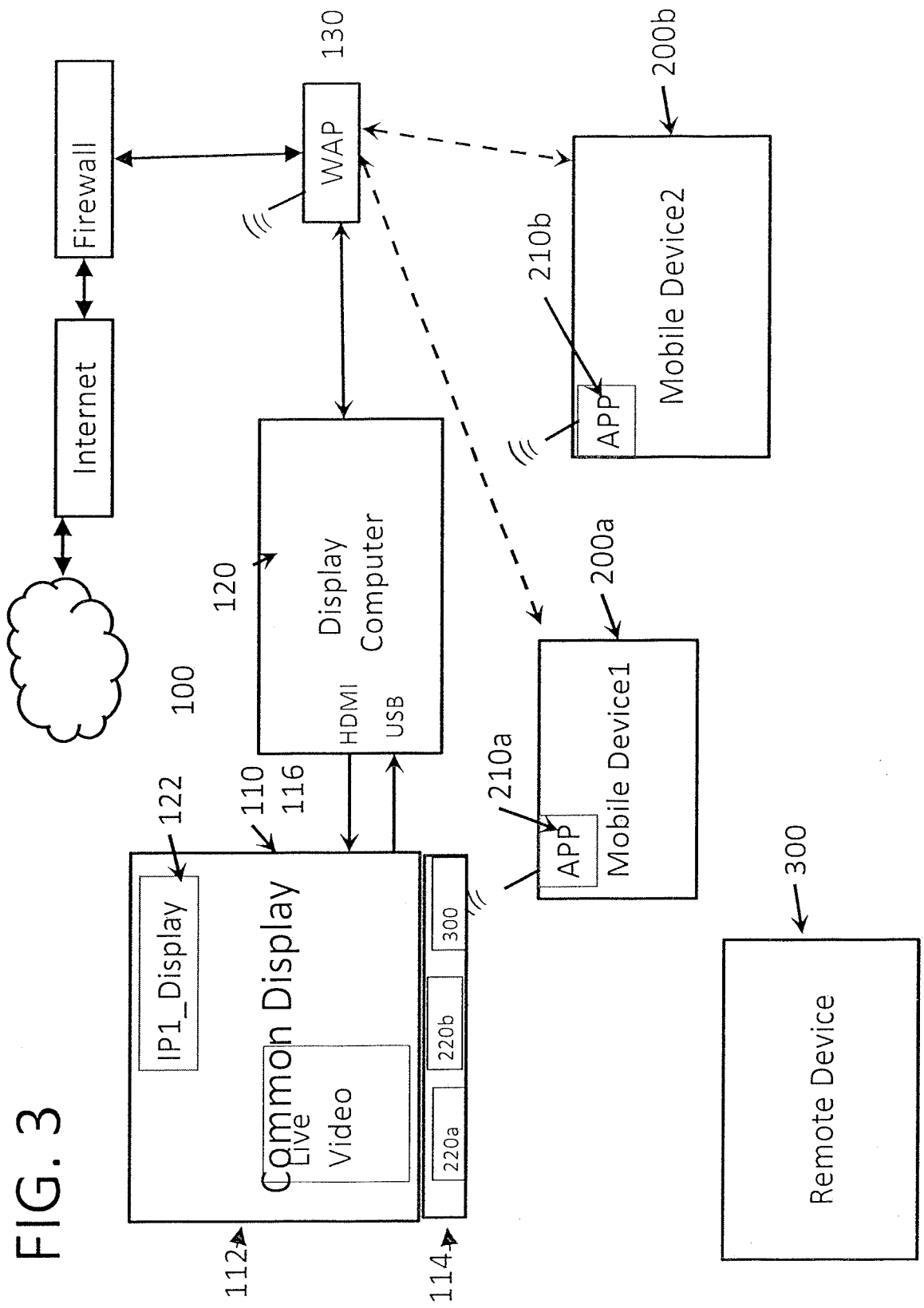

For example, as illustrated in FIG. 3, when the video conferencing panel (VCP) is streamed for a remote device 300 to the Common Display 110 at a single location, rather than placing the VCP on the Canvas, the VCP may be in a particular position on the Common Display 110. The remote device 300 may provide the live video stream using a peer-to-peer connection. This peer-to-peer connection may be established through a relay server, e.g., in the cloud, which does not store anything, but just relays that live video stream. The VCP may originally appear as a thumbnail in the tray region 114. The VCP may be moved, resized, and so forth, without affecting the remainder of the Canvas and the Canvas may be manipulated as discussed above with affecting the VCP. The VCP may always be brought to the front of the display such that a portion of the Virtual Canvas under the VCP will not be visible. Having established the connection to the Virtual Canvas on both Common Displays, e.g., having started a session, no additional information is needed to start the video conferencing, i.e., other than selecting the software to be used for the video conference, no separate video conferencing session is needed. In an implementation, the Virtual Canvas may be stored in the cloud, while the video conferencing would still be peer-to-peer, as it is separate from the Virtual Canvas.

Figure 4:
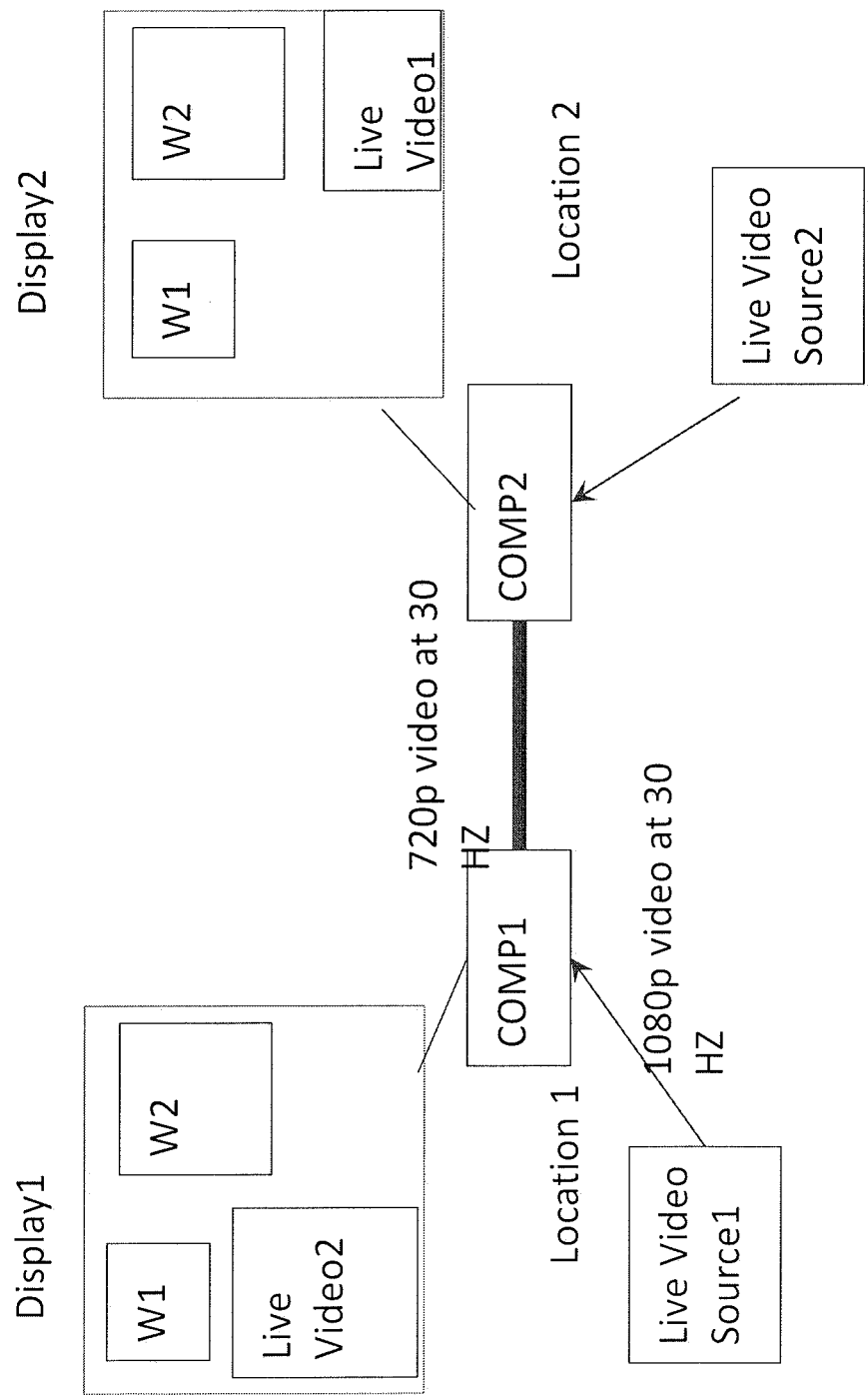

When using multiple locations, the VCP may be streamed from a first location to the other multisite locations, as shown in FIG. 4 and vice versa. This allows users in the various other locations to view the video in real time, i.e., at the same time as the source location (real time video viewing is enabled with minimal inherent delay due to the peer to peer connection). Again, the VCP is to be separate from the Canvas. Thus, each location may have a VCP at a different position and/or size on the corresponding Displays and viewing other location(s) video streams VCW1 and VCW2 (and may display its own video conference stream in a VCW), but still see identical views of the Canvas having other windows thereon. Here, the live video may stream directly between locations (direct peer-to-peer connection) or may stream through a relay server forming a peer-to-peer connection. When there are more than two locations streaming video, each VCW for the other locations may have their own positions that do not change with movement or other manipulation of the Canvas.

When forming a peer-to-peer connection through a relay server, the relay server may be on the same internal network as the Multisite computers (private network connection) or may be in the cloud. If the Relay Server is placed on the private network, then the speed of the connection may be faster compared to a server placed in the cloud. However, even a Relay Server placed in the cloud is typically much faster than the typical video conference method, as described above.

Figure 5:
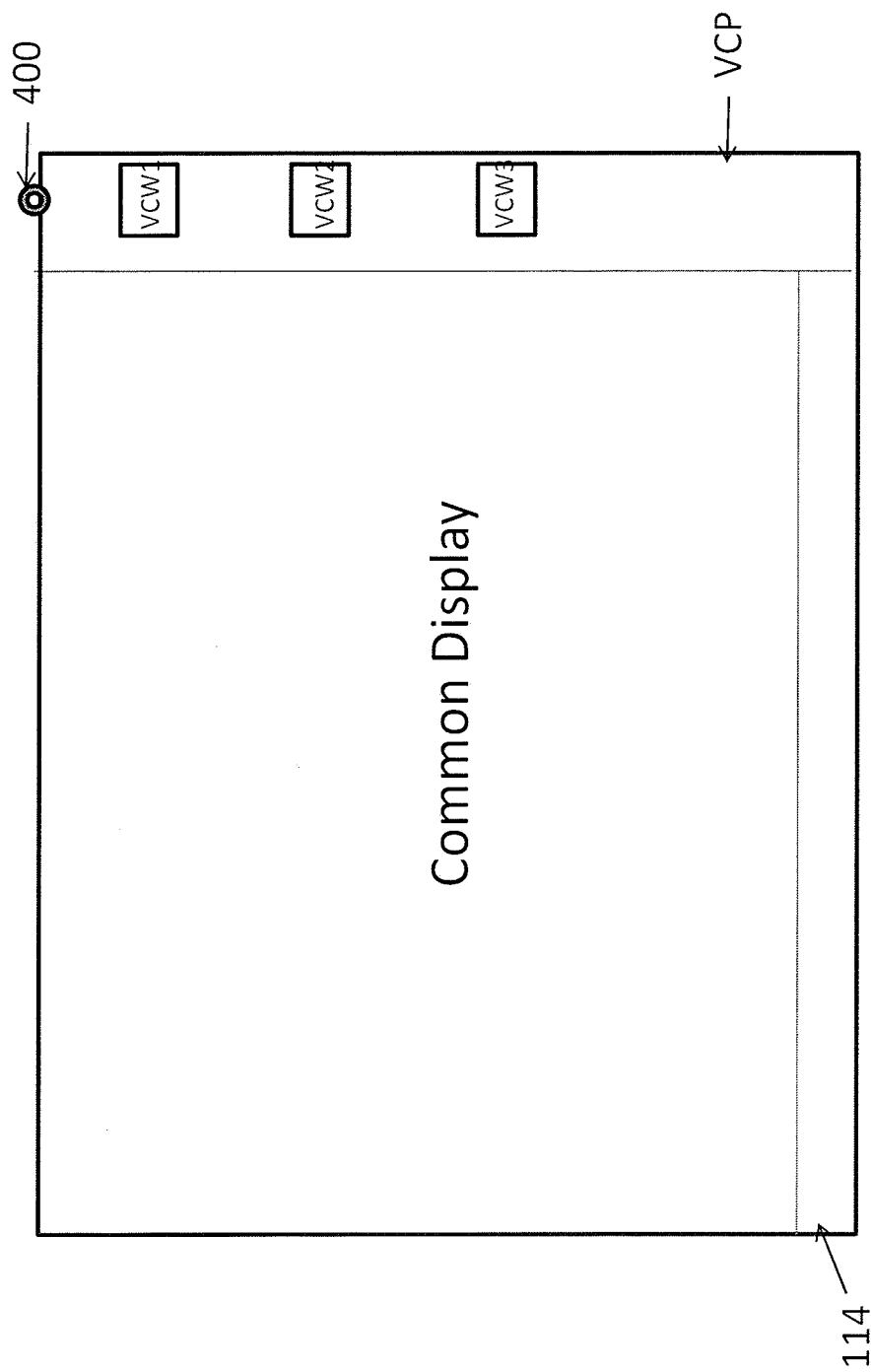

In particular, when using Multisite, all objects on the canvas are sent between computers. The Common Display may display the VCP in one section of the Display and the Virtual Canvas in another section. VCP showing the live video conferencing feeds, e.g., windows in the VCP, may be on a panel at a particular location on the Common Display, e.g., on a side portion of the Common Display, as shown in FIG. 5. All other video feeds may be on the Virtual Canvas. This way when the Virtual Canvas is moved or resized on the Common Display, the VCP remains stationary.

As shown in FIG. 5, the VCP may include multiple video conferencing windows (VCWs), e.g., VCW1 to VCW2. When one of the VCWs is to be selected, e.g., either an audio signal is associated with the window or a user of the Common Display selects a VCS, here VCS2, that VCS may be altered, e.g., may be closer to a camera and/or enlarged to enhance the conferencing experience. For example, when the selected VCS changes to be near the camera, the user of the Common Display will more closely appear to be interacting with the user in the VCS.

Figure 6:
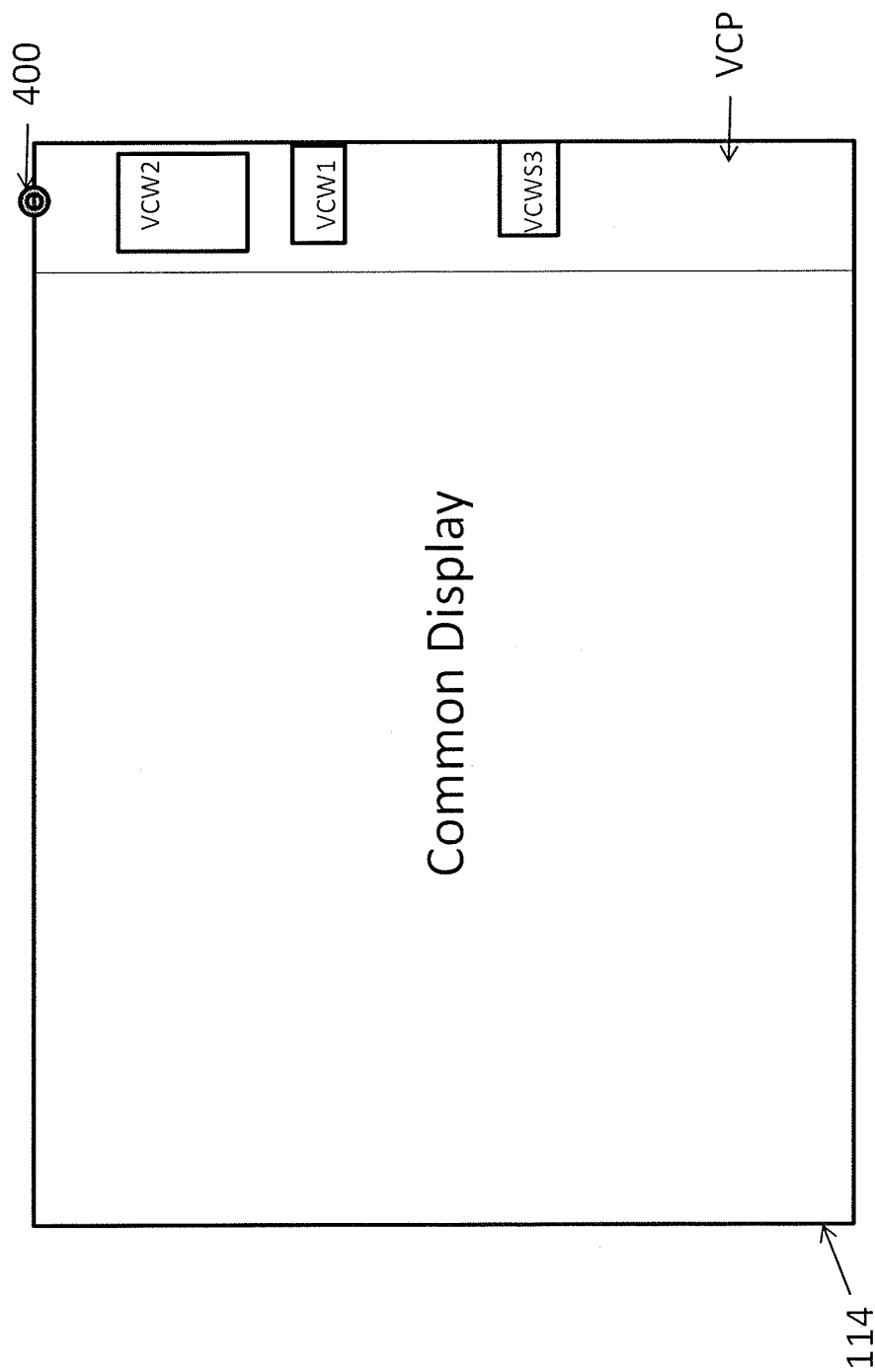
Figure 7:
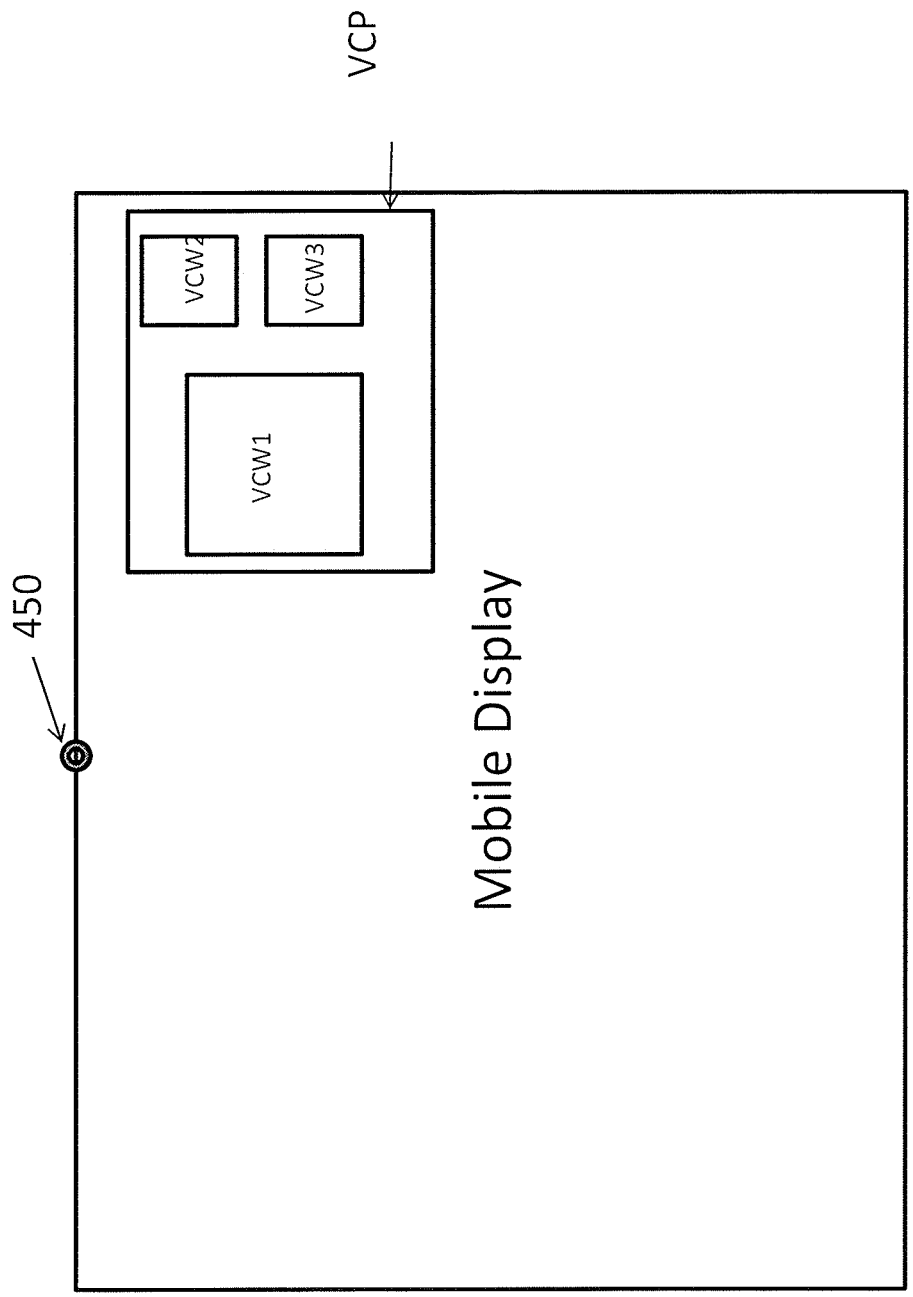
Figure 8:
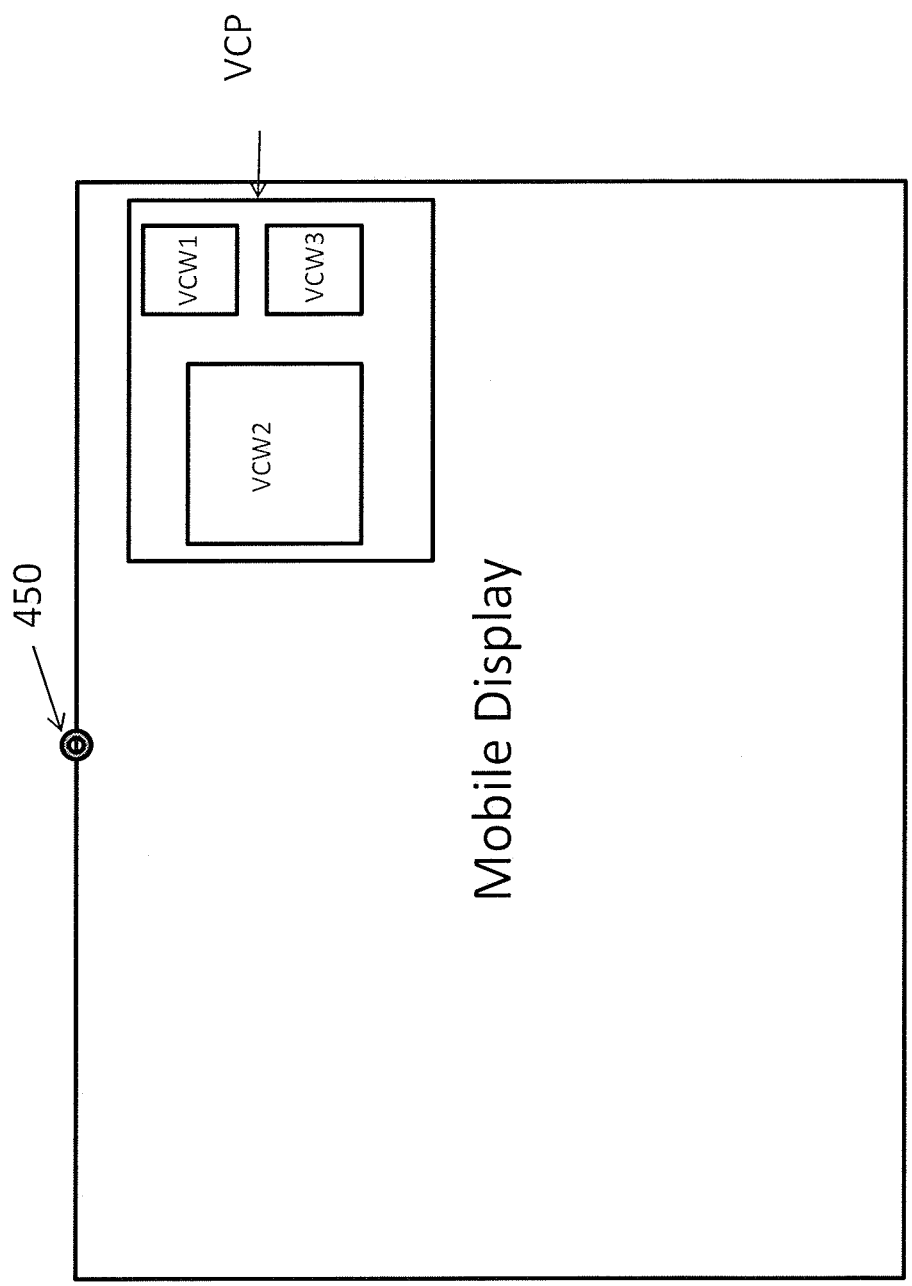

In contrast, when using AirConnect™ on a mobile device, a user of the mobile device views a rendering of a canvas, rather than the objects being sent thereto. Here, as shown in FIGS. 7 and 8, one window contains the canvas and there is a separate panel VCP for video conferencing. The VCP may have a primary large window and a strip, e.g., on the right side that contains multiple smaller windows. Each of the smaller windows contains a video stream from a remote user. Clicking on any one of the smaller windows, e.g., VCW2 in FIG. 6, places the corresponding video stream in the large window. Alternatively, several windows may be larger and several windows smaller. Another alternative is for the AirConnect™ app to detect which window contains audio and for that window to be automatically made larger. Since a camera 450 on the mobile device is typically centrally located and the mobile device screen is much smaller than the Common Display, moving the VCW may not be needed.

Mobile Device-to-Device Video Conferencing: Once a single user downloads an AirConnect™ app on to their mobile computer device, they may request to schedule a video conference with a particular user. Typically each user will have a user account. A cloud server can be used to schedule a video conference between two users with User Accounts. Once the video conference is initiated then the video conference can be started with a peer-to-peer connection. The virtual canvas data can be stored on a device (Host Computer) that is running the ThinkHub® app. The Host Computer can be one of the mobile computers in the video conference or a separate server. If the Host Computer is a separate server, it may be a cloud server. The Host Computer may be the Display Computer. But in this case a physical display is not necessary, since there may be no need for a user to be located near this display, in a position where they can see or touch this display. In this case, the Host Computer a Virtual Display Computer.

Alternatively, without user accounts, a first user can initiate a video conferencing call with the AirConnect™ app. Once the video conference is established a key can then be generated a first user can then contact a second user and send them the key. The second user can then joint the Video Conference by entering the key into the AirConnect™ app. As in the preceding paragraph, the Host Computer can be one of the mobile computers in the video conference or a separate server.

Mobile Device to Display Computer Video Conferencing. In this case there may be one or more users in a conference room working on a touch display that is being driven by a Display computer. A user located remotely is working on a Mobile Device Computer. This remote user has AirConnect™ app downloaded and running on their Mobile Device Computer. The remote user joins the ThinkHub® session running on the Display Computer through the AirConnect™ app. This allows the participants in the conference room with the Display Computer to start a video conference between them and the remote user.

Multisite Video Conferencing: This for video conferencing between multiple rooms, where each room has a Display Computer and explained above.

Remote Users joining a Multisite Video Conference. Suppose there are two Display Computers in a Multisite Video Conferencing session (Display Computer 1 and Display Computer 2). If a remote user joins Display Computer 1 in a video conference, then the video feed from the camera from the remote user will be sent to Display Computer 1. Then the ThinkHub® multisite application will send that same video feed to Display Computer 2. Display Computer 1 and Display Computer 2 will share video and data as in the preceding paragraph. However, in this case both Display Computer 1 and Display Computer 2 will send the video information from their camera to the remote user. Alternatively, each video stream may be sent to every display individually, rather than being sent through the Multisite connection.

For either configuration, for further data reduction any of the above embodiments, down sampling (Dynamic Resolution Scaling (DRS)) may be used as disclosed in U.S. patent application Ser. No. 15/056,787 and in International Application No. PCT/US2017/064525, both of which are incorporated herein in their entirety for all purposes. When streaming live video windows in the manner disclosed above the bandwidth required can be much larger than with conventional web-based or video conferencing. For example, suppose at location 1 there are six video sources connected to COMP1. Each of these may be placed on the canvas and each may have a resolution of 1080p hd. Suppose that at location 1, DISPLAY1 has a resolution capable of displaying all six video sources simultaneously and the view of the canvas is such that all six video windows are displayed on DISPLAY1 at the same time in full 1080p HD. (That would mean that DISPLAY1 has resolution of at least 12k). Normally, in web-based conferencing the source computer sends the entire video stream at a predetermined resolution because it has no information of how the content is being viewed on the receiving side. However, with ThinkHub® multisite software, if at location 2, COMP2 has only a 4k display, then, at most 4k resolution would need to be transmitted. Suppose for example at location 2, the canvas is being zoomed in to a particular section of the canvas such that only three of the six videos are in view at a given time and these three videos are being displayed at 720p resolution. Then COMP2 can send data to COMP1 requesting that the three videos in view are sent at full frame rate but at a lower resolution (720p). The three videos out of view can be sent at lower resolution and/or very low frame rate, for example 1 frame per 2 seconds. In this manner the total bandwidth can be reduced to lower than the size of the display at location 2. In this manner, the bandwidth of the data transmitted can be reduced to the lower of (a) The resolution of the receiving display times the viewing frame rate;
(b) The combined resolution of all of the streaming video signals times the viewing frame rate; and
(c) The combined resolution of all of the streaming video signals as displayed on the receiving display times the viewing frame rate.

The algorithm may be set to always lower the bandwidth to the lower of (b) and (c) above, which will mean that it will always be as low or lower than the lower of (a) and (b) above. Note that in the above analysis bandwidth for the off-screen video signals was not taken into account, since they would be sent at such low frame rate that their bandwidth would be negligible.

In the method above, all the video sources send all info at full resolution to COMP1. Based on information received from the other computers in the Multisite session on how the live video windows are being viewed thereon, COMP1 down samples the transmission to the other sites. In addition to this, COMP1 can also use this information to send info to the live video sources to downsample the video streams prior to sending the info to COMP1. In this situation a laptop would only send its full resolution signal if at least one computer in the multisite session was viewing that live signal at the laptop's full resolution or larger.

In accordance with another embodiment, a display computer 120 in FIG. 1 may run a restricted Virtual Canvas, e.g., HubVC™ video conferencing and collaboration software by TIV®. While the Virtual Canvas described above in connection with the first embodiment is unrestricted, i.e., very large, e.g., twenty or up to infinite times the viewable portion of the display, provides great flexibility and capabilities, some users that just want to do a few simple tasks or work on only a small number of documents at the same time, the use of the unrestricted Virtual Canvas may unnecessarily complicate use thereof. Thus, a restricted Virtual Canvas may provide simpler and limited set of features, i.e., some features of the unlimited Virtual Canvas are eliminated or restricted in order to make it easier to use and cheaper. For example, windows in the Restricted mode cannot be panned, zoomed or pinched as described above for the unrestricted Virtual Canvas. The restricted Virtual Canvas may still serve as a shared canvas when another computer is running canvas software, e.g., ThinkHub® canvas software or HubVC™ canvas software.

In one example of the restricted Virtual Canvas, only a few views of the restricted Virtual Canvas are allowed. For example, there may be two allowed views, e.g., a single view or minimum view, i.e., where a fixed number e.g., four, of windows are displayed, with the size of each window being a minimum size to be displayed. The fixed number of windows that are in view makes interaction therewith more manageable, limits the amount of processing power needed, and insures a minimum size of a window. These windows may each display one of a mobile device stream, a white board, a video conference stream, and a snapshot of a stream, and windows having at least two of different types may be on the restricted Virtual Canvas. While numerous windows, may be on the restricted Virtual Canvas, only a fixed maximum number, e.g., four, windows may be viewed at a time. When more streams or windows than the fixed number are sent to or opened on the restricted VirtualCanvas, they can be placed on the restricted VirtualCanvas, out of view and therefore not displayed, they may still be accessed by scrolling or a small portion of the out-of-display windows can be displayed to indicate to a user that there is more content on the restricted Virtual Canvas out of view.

In this manner, if the use of the restricted Virtual Canvas is limited to only a single view and minimum view, e.g., a quad view, there are some advantages in terms of simplicity and ease of use. For example, with an unrestricted Virtual Canvas, if many pieces of content are loaded thereon and the unrestricted Virtual Canvas is zoomed out to view the entire unrestricted Virtual Canvas or a large portion thereof, it can be difficult for a user to view the individual windows.

The HubVC™ Canvas ensures that the main windows are never smaller than 1/n the size of the full screen, wherein n is the maximum number of windows to be viewed, so that all of the windows can be easily viewed.

Figure 9B:
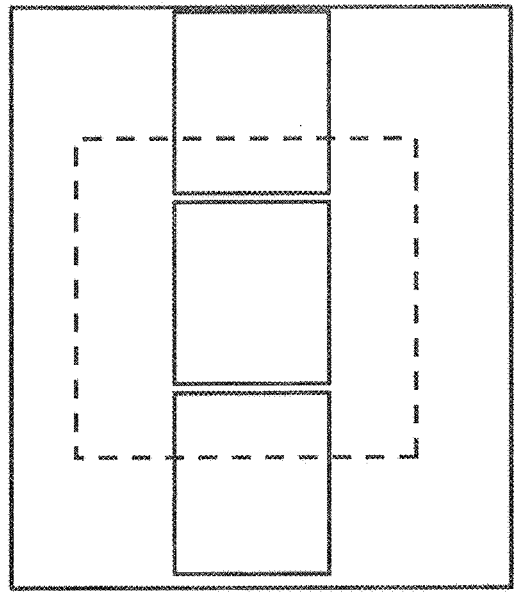
FIGS. 9A to 9C illustrate differences between the first embodiment and a second embodiment.
Figure 9C:
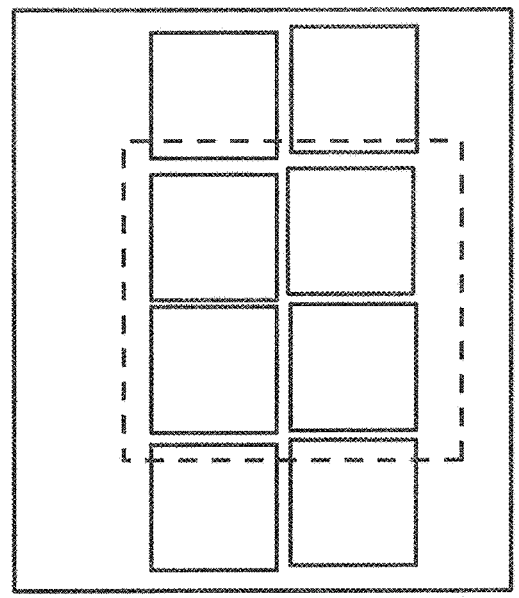
Figure 9A:
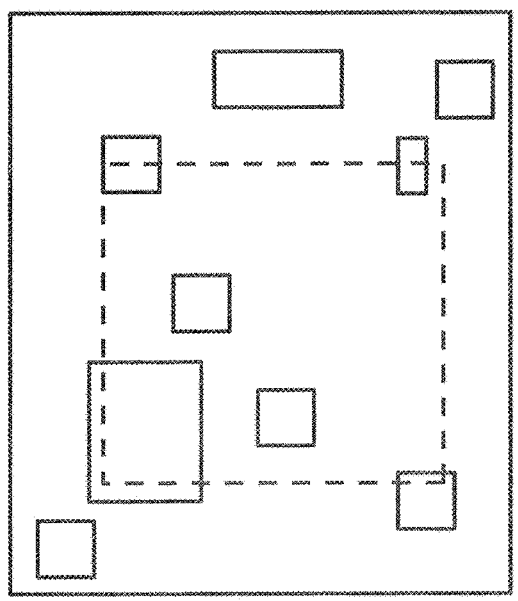

Comparisons between an unrestricted Virtual Canvas and a restricted Virtual Canvas are illustrated in FIGS. 9A to 9C. As may be seen in FIG. 9A, when content is on the unrestricted Virtual Canvas, windows displaying the content may have various sizes and may not be visible in the view, indicated by the dashed line, of what is actually shown on the display. As may be seen in FIGS. 9B and 9C, when content is on the restricted Virtual Canvas, all windows have the same size. When the restricted Virtual Canvas is in the single view mode, as shown in FIG. 9B, only a single window (or a single window and edges of adjacent windows) is viewable in the display. When the restricted Virtual Canvas is in the fixed number view mode, e.g., quad mode, as shown in FIG. 9C, only a fixed number of windows (or a single window and edges of adjacent windows) are viewable in the display. This is true even if only two streaming content are being sent, with the other windows remaining blank. In both embodiments, windows that are outside of what is actually being displayed may not be updated in real time.

Figure 10A:
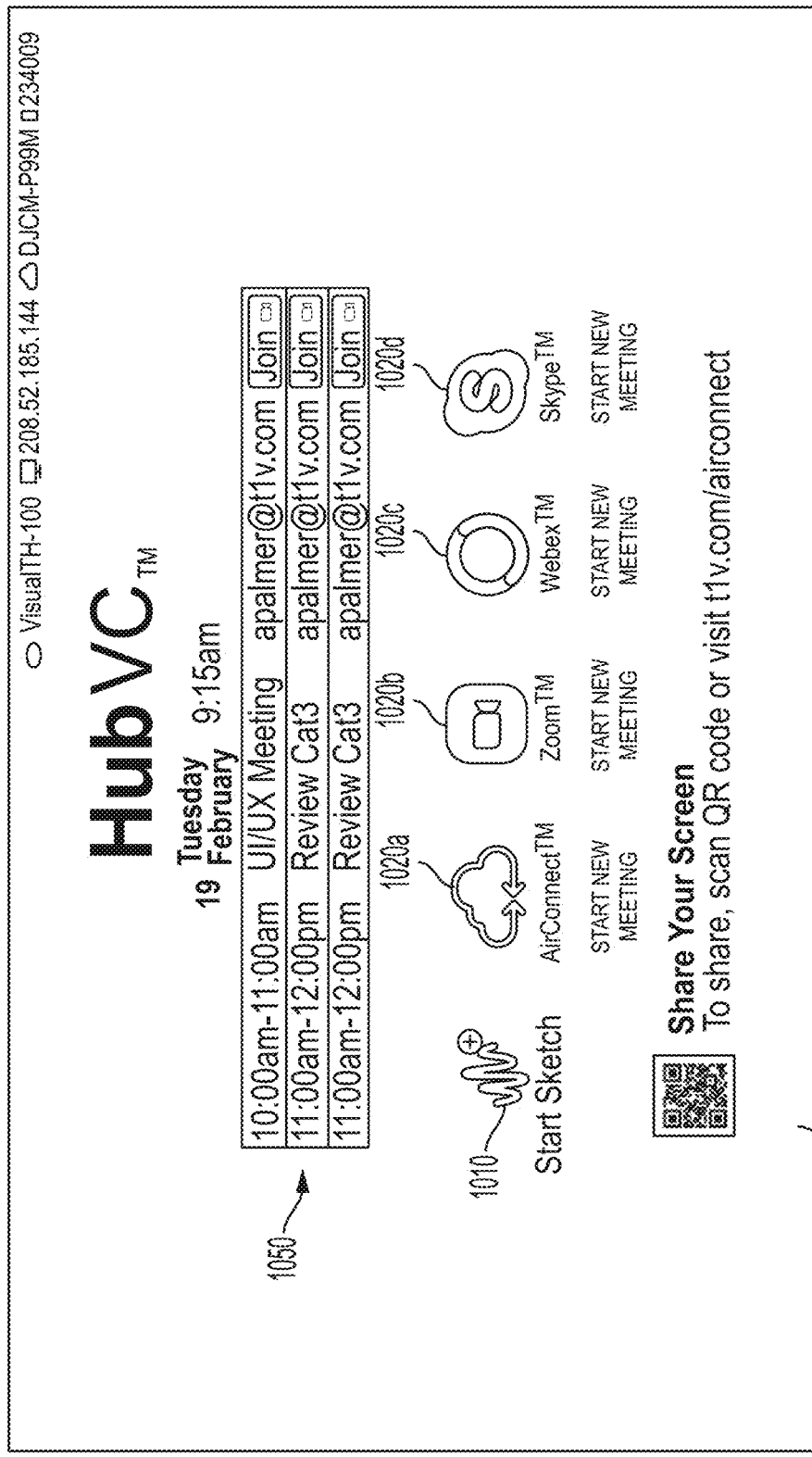
FIGS. 10A to 10U illustrate a display system in accordance with the second embodiment.
Figure 10B:
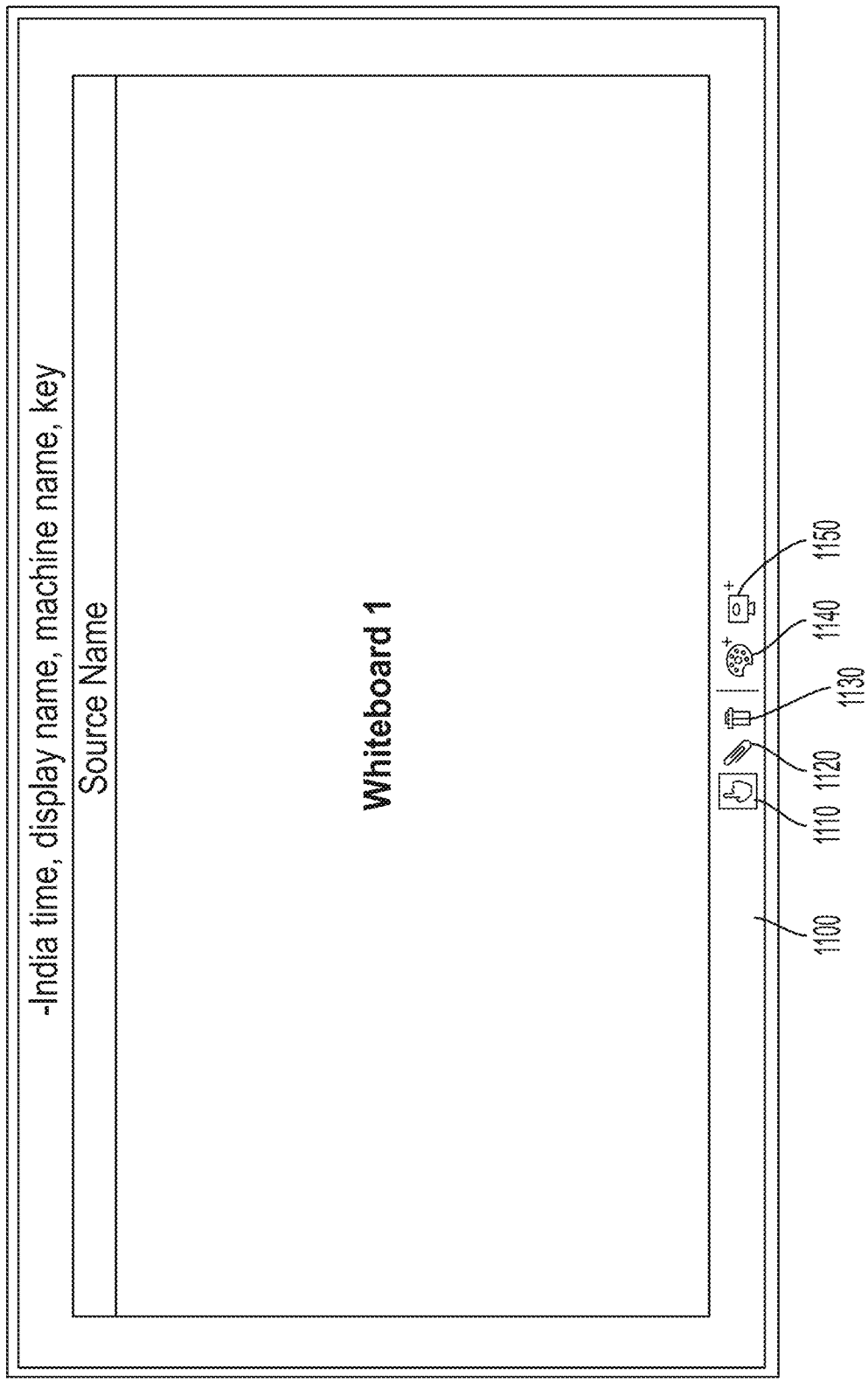
Figure 10C:
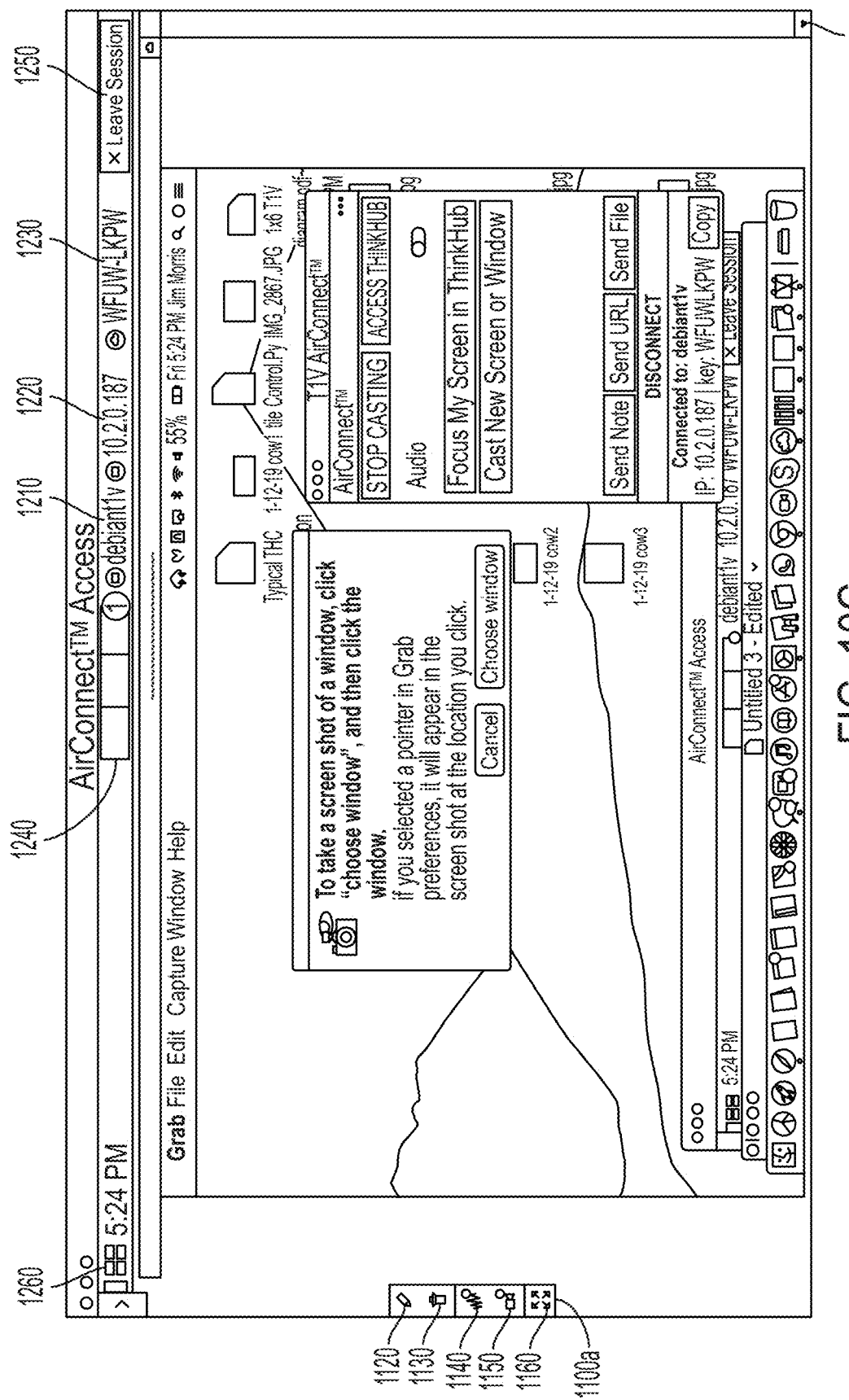
Figure 10D:
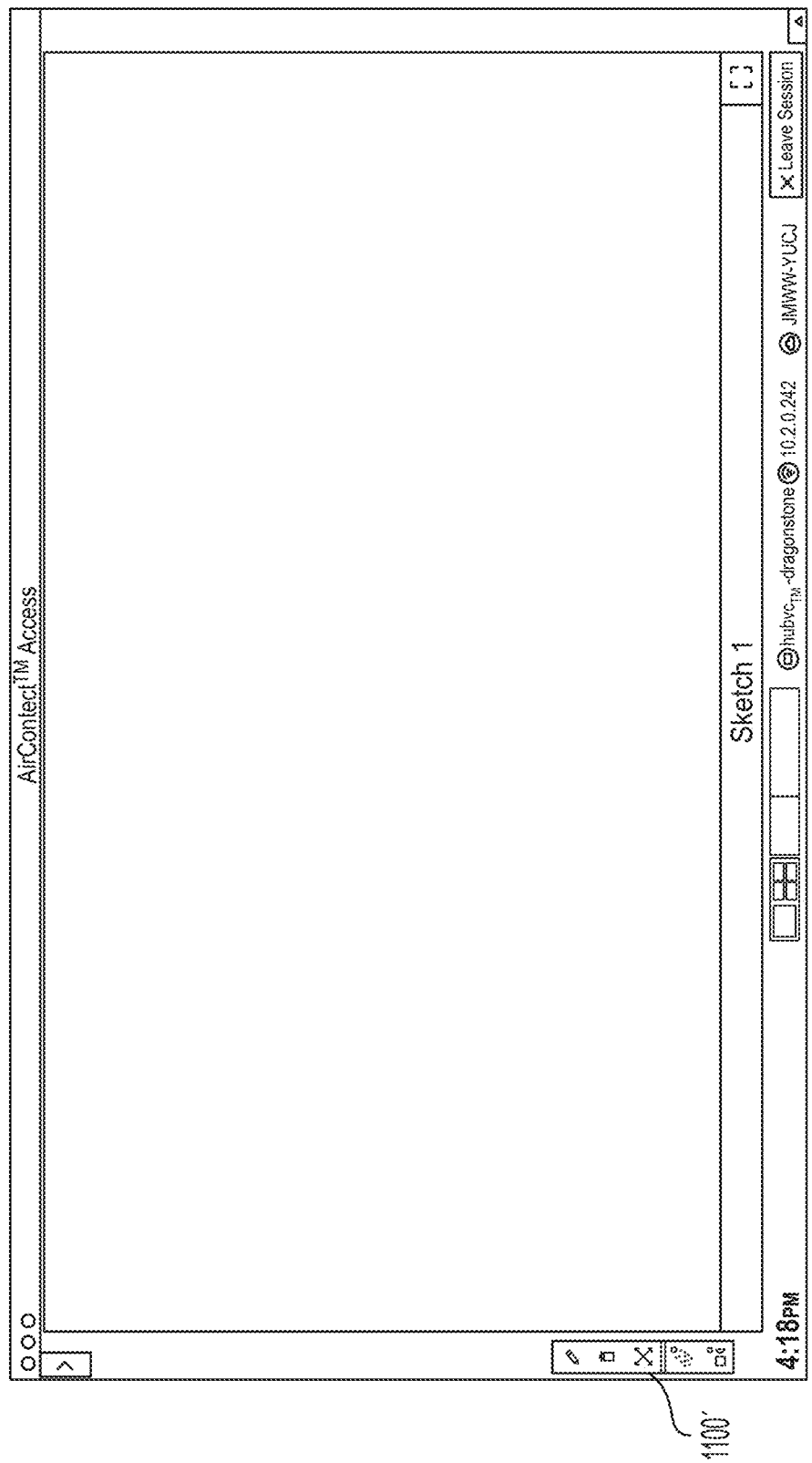
Figure 10E:
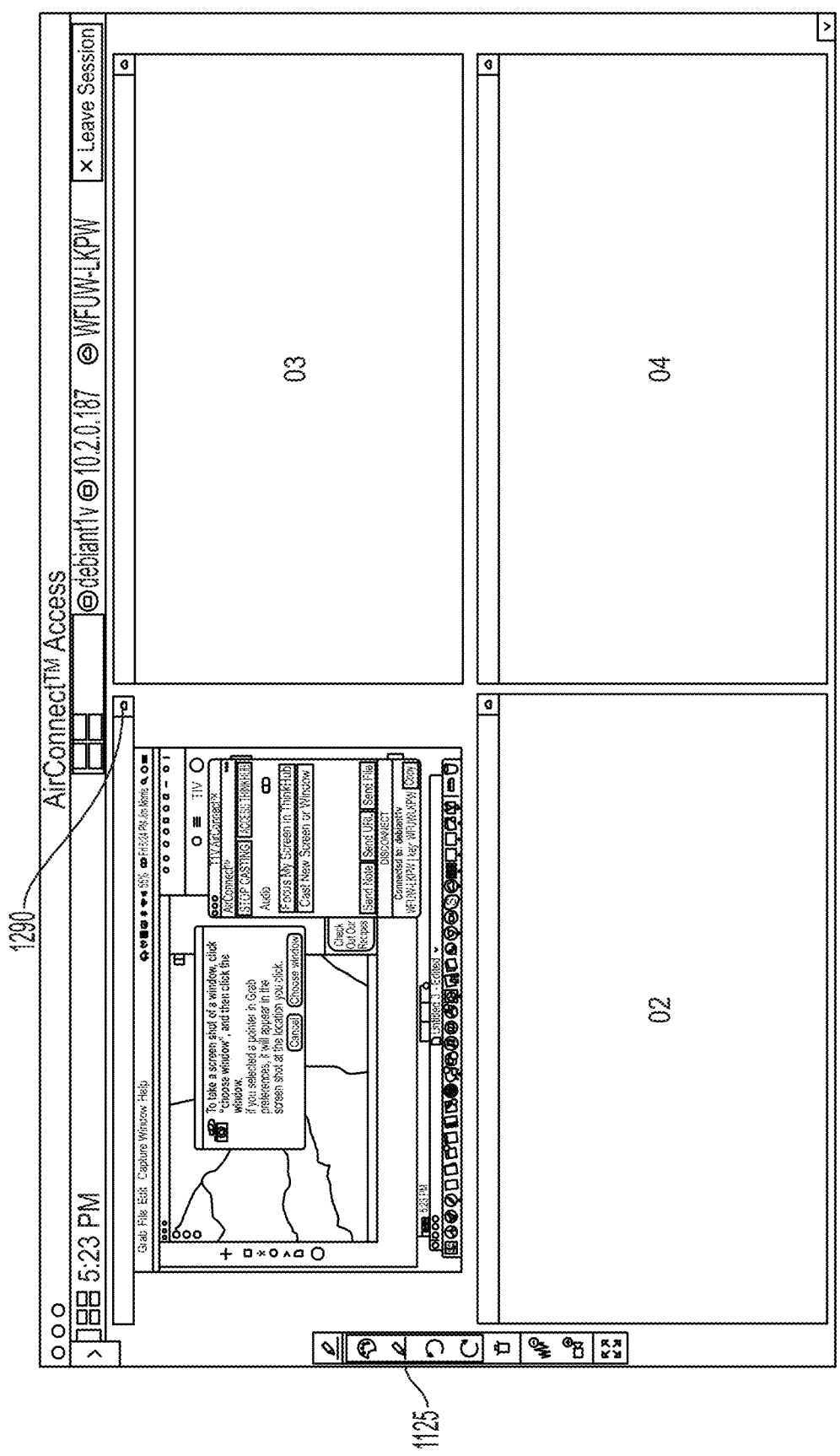
Figure 10F:
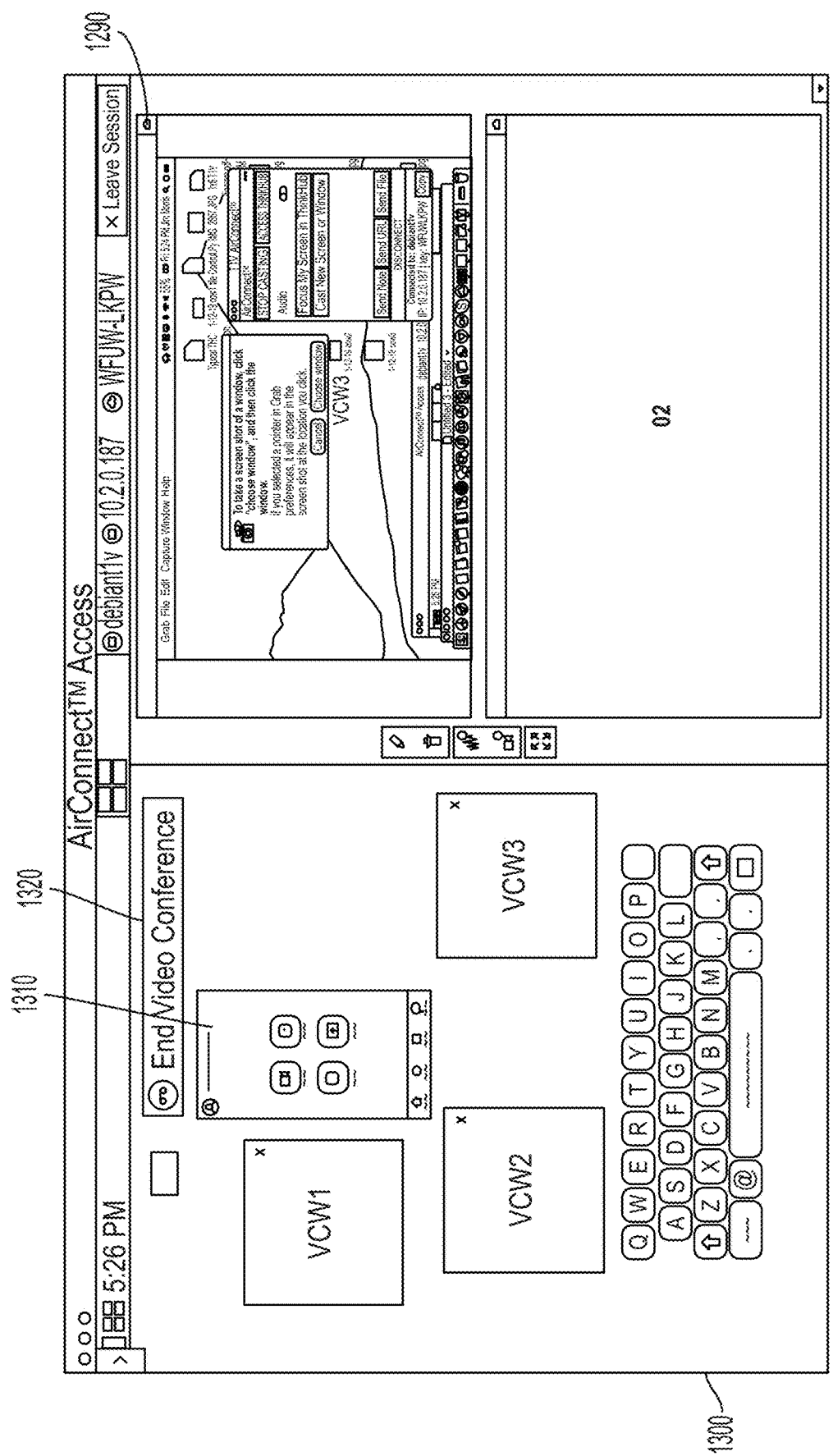
Figure 10G:
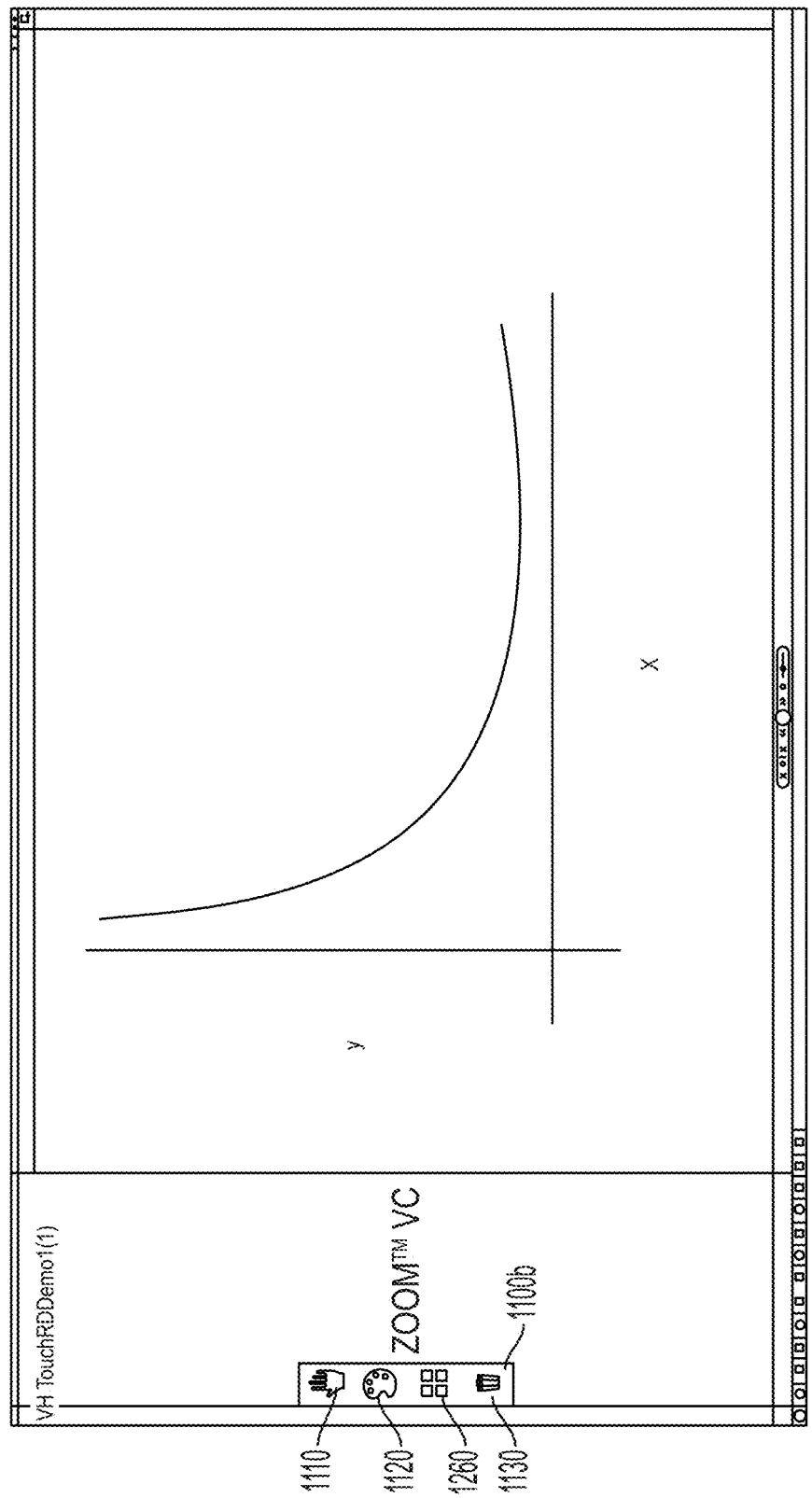
Figure 10T:
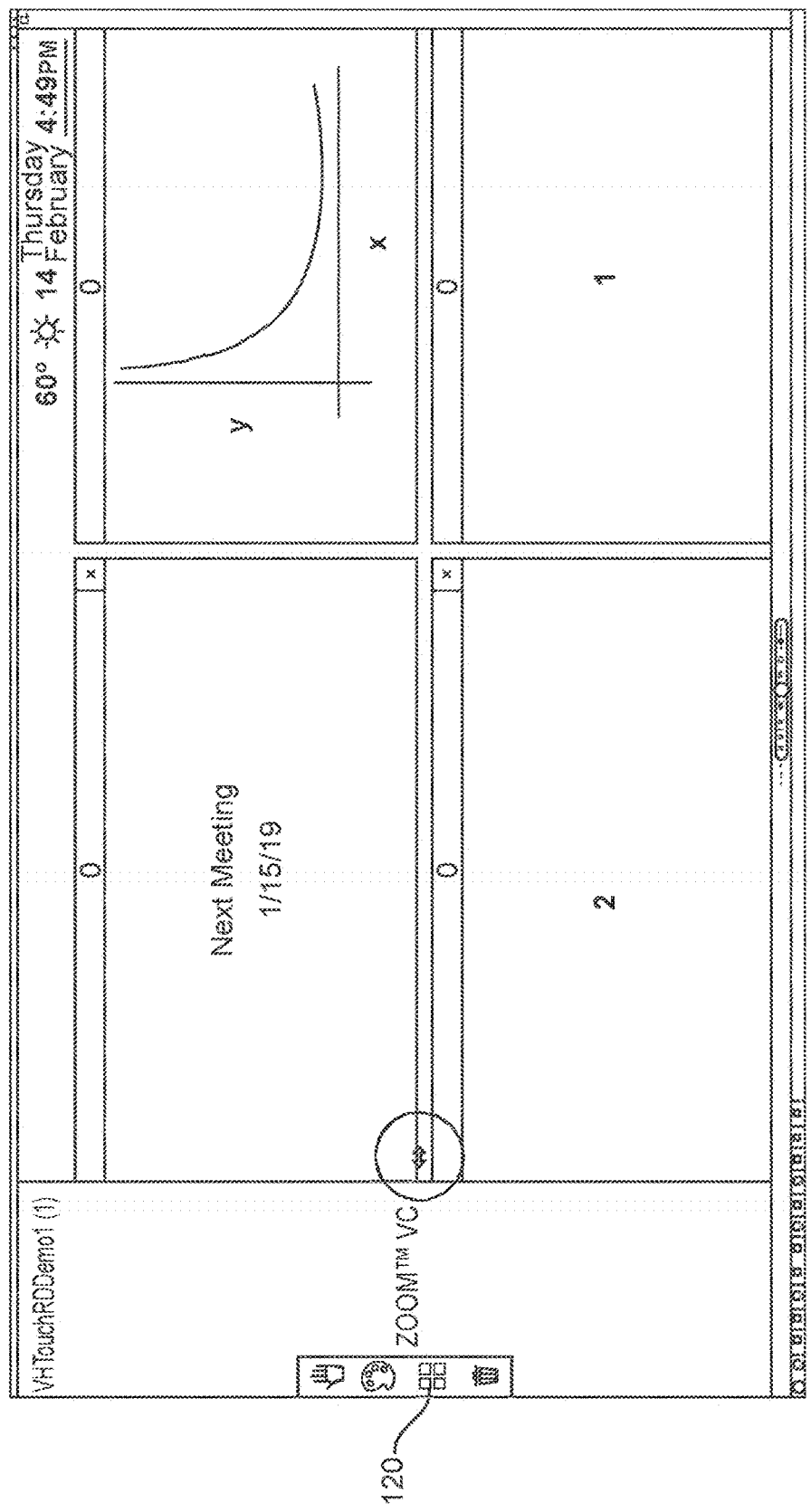
Figure 10J:
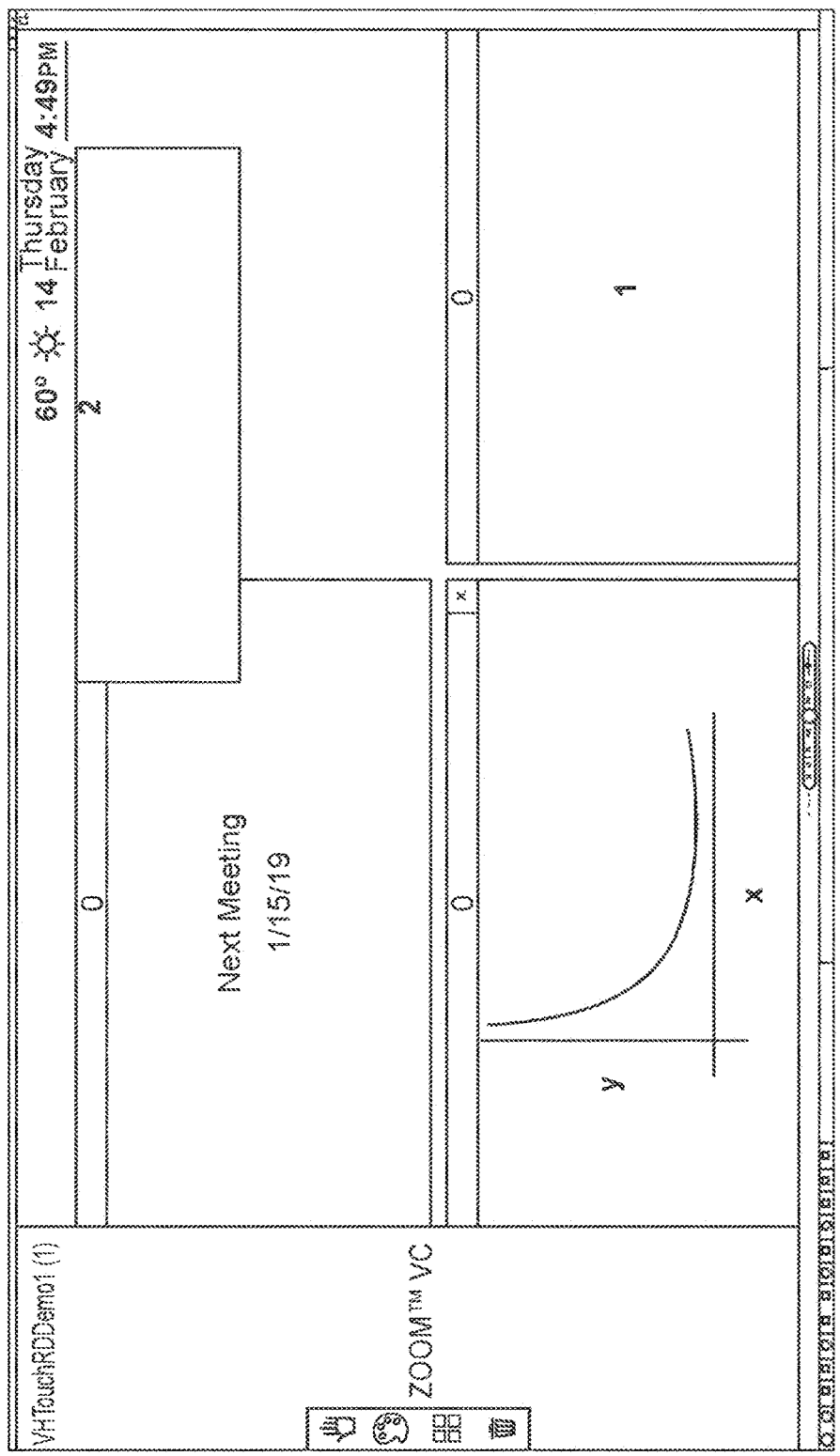
Figure 10K:
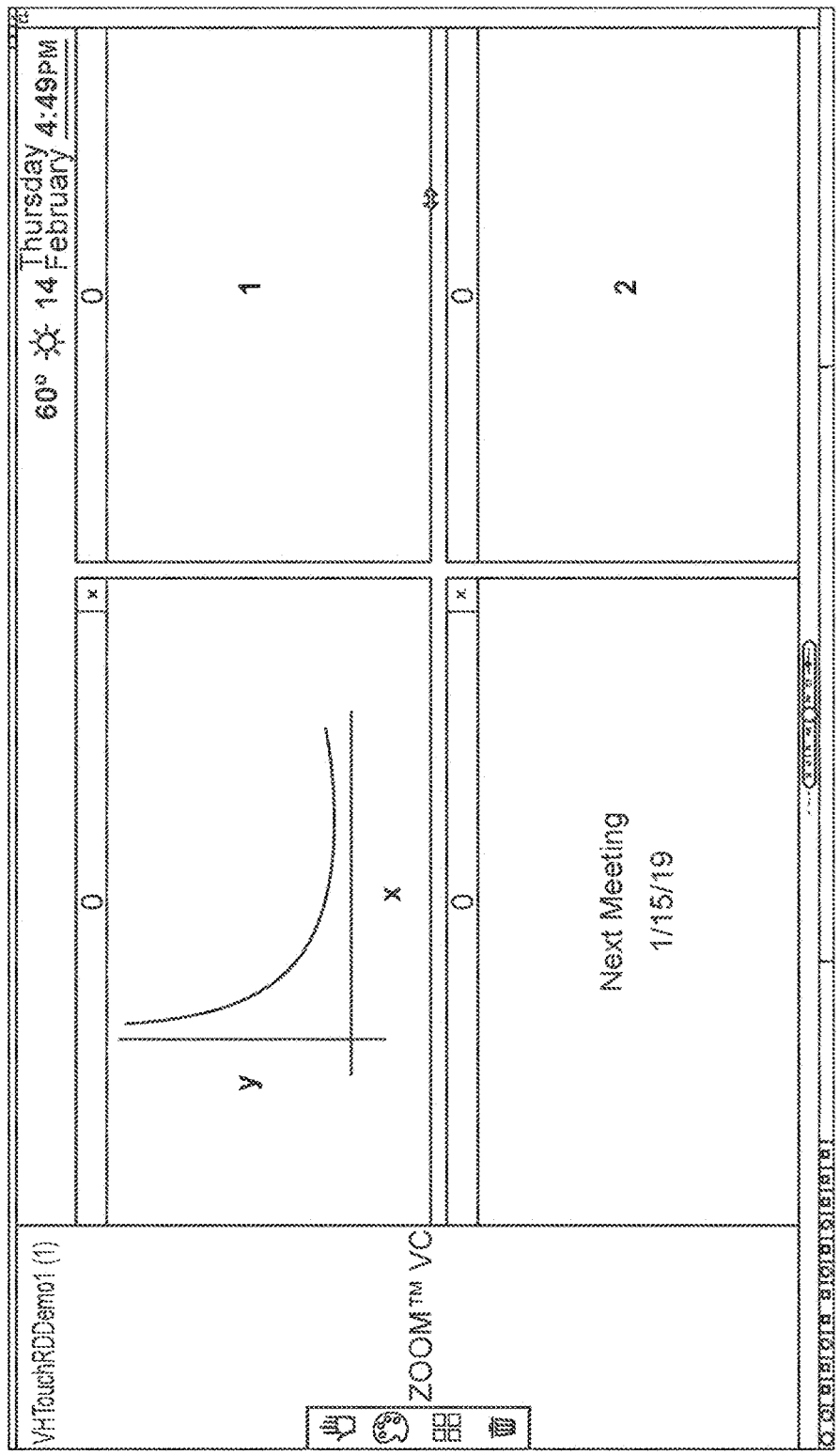
Figure 10L:
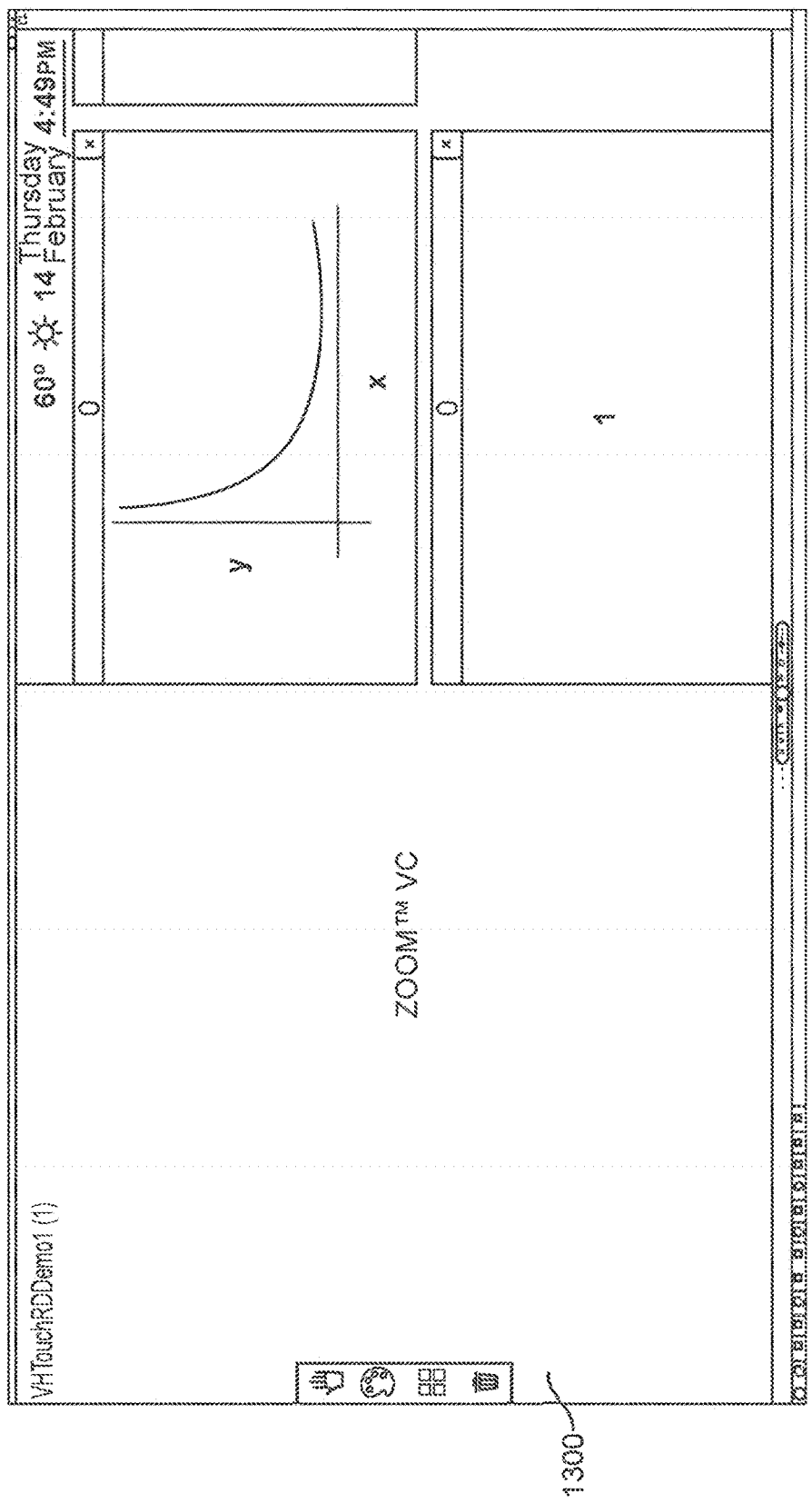
Figure 10M:
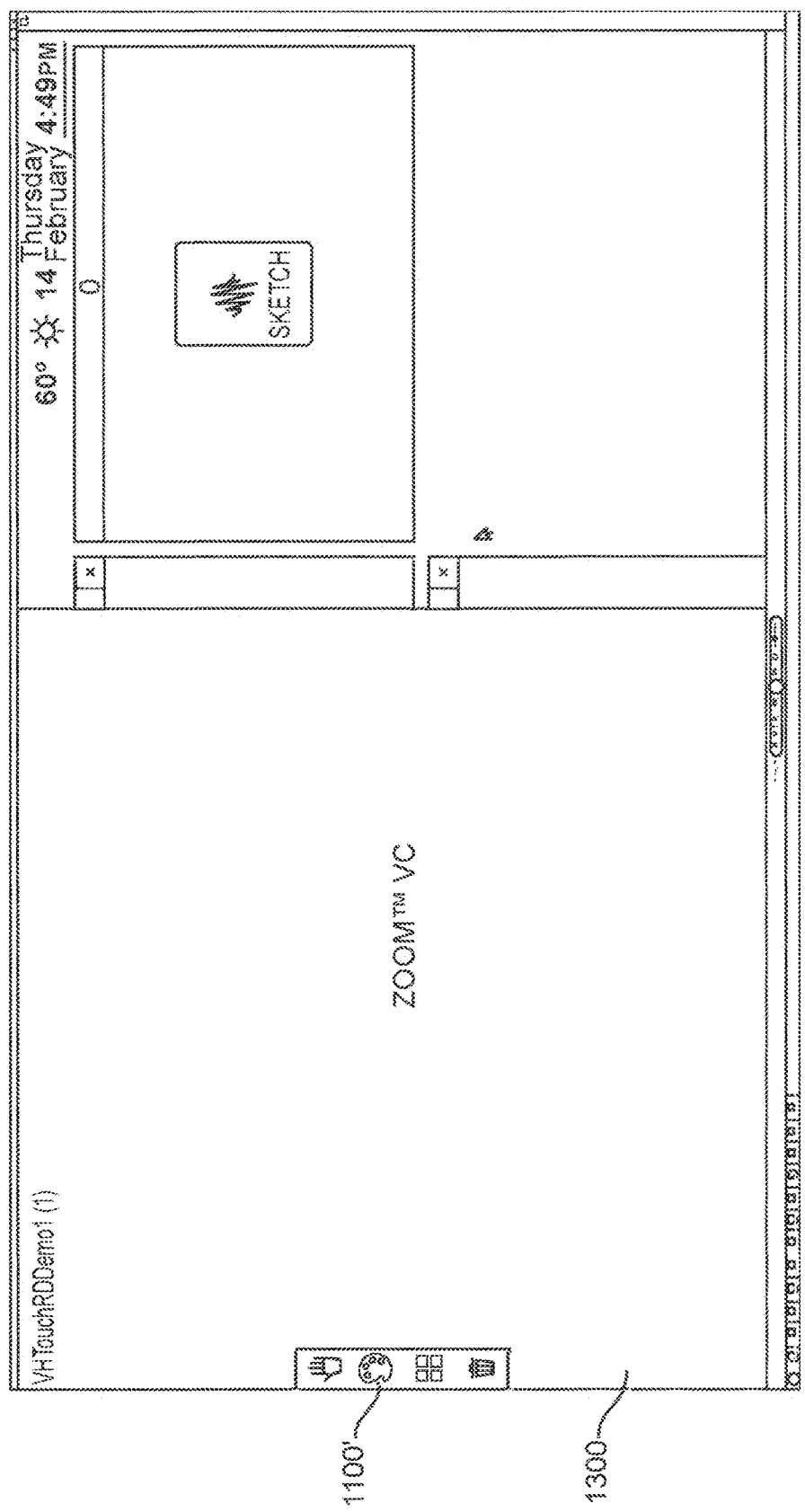
Figure 10N:
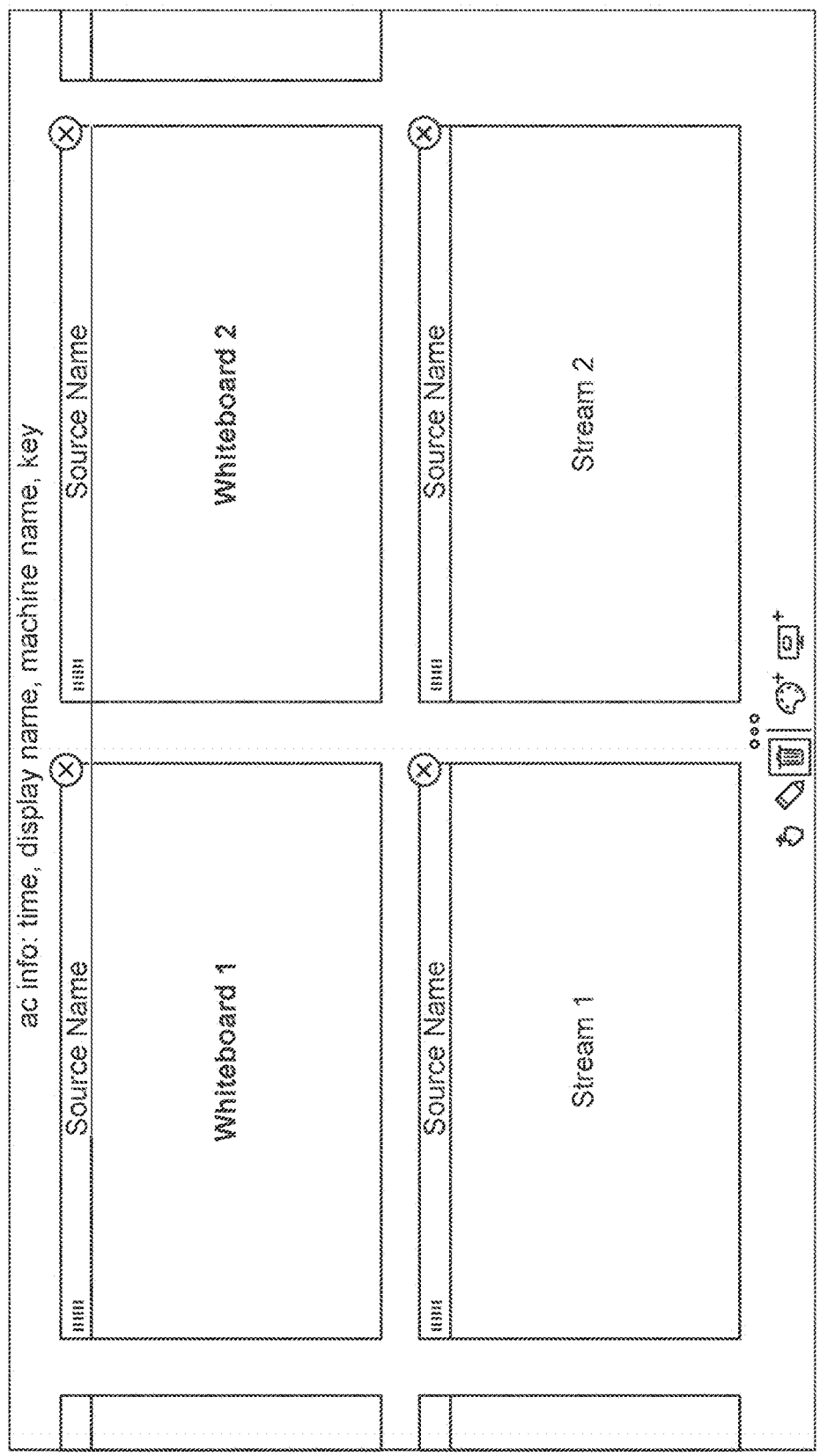
Figure 10O:
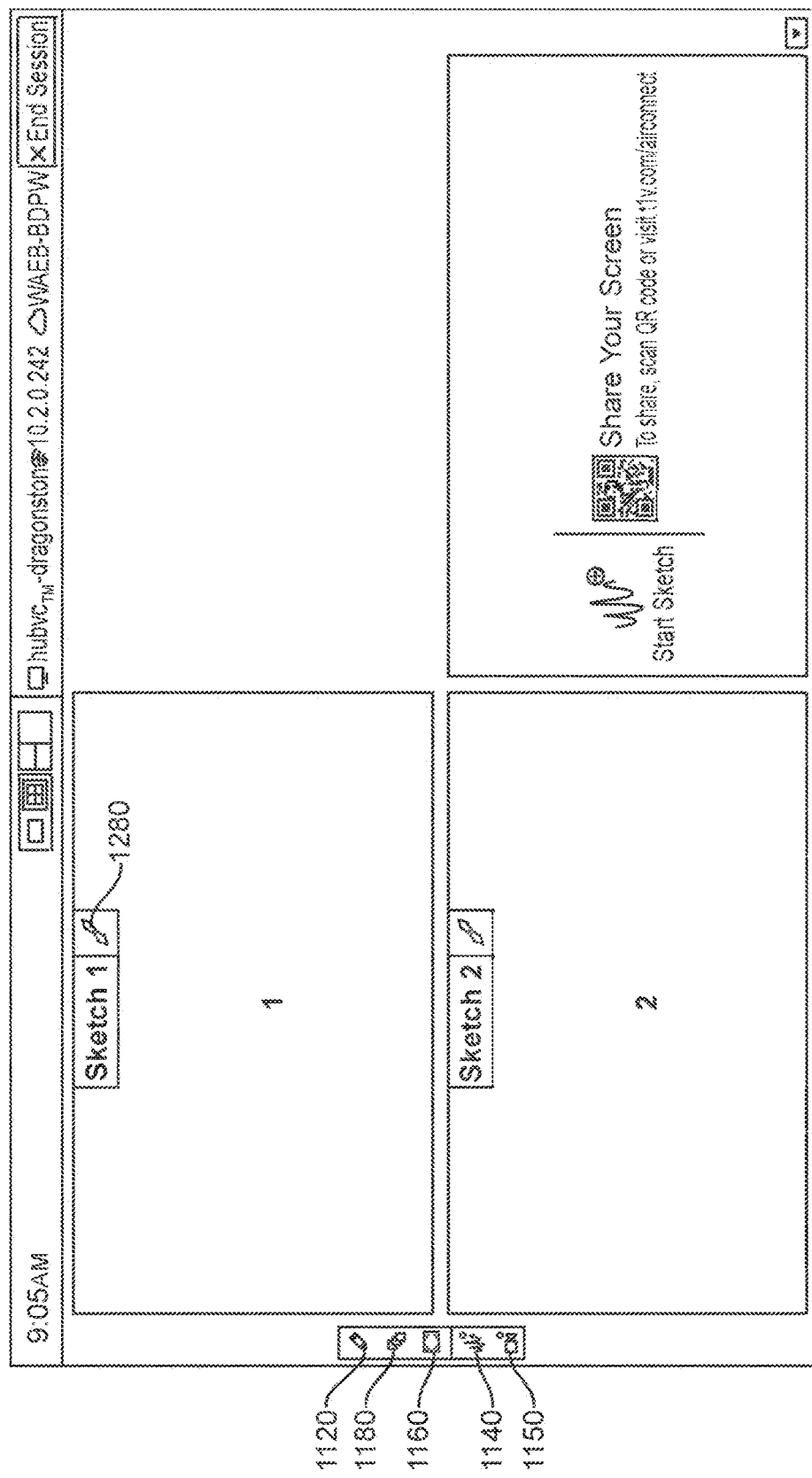
Figure 10P:
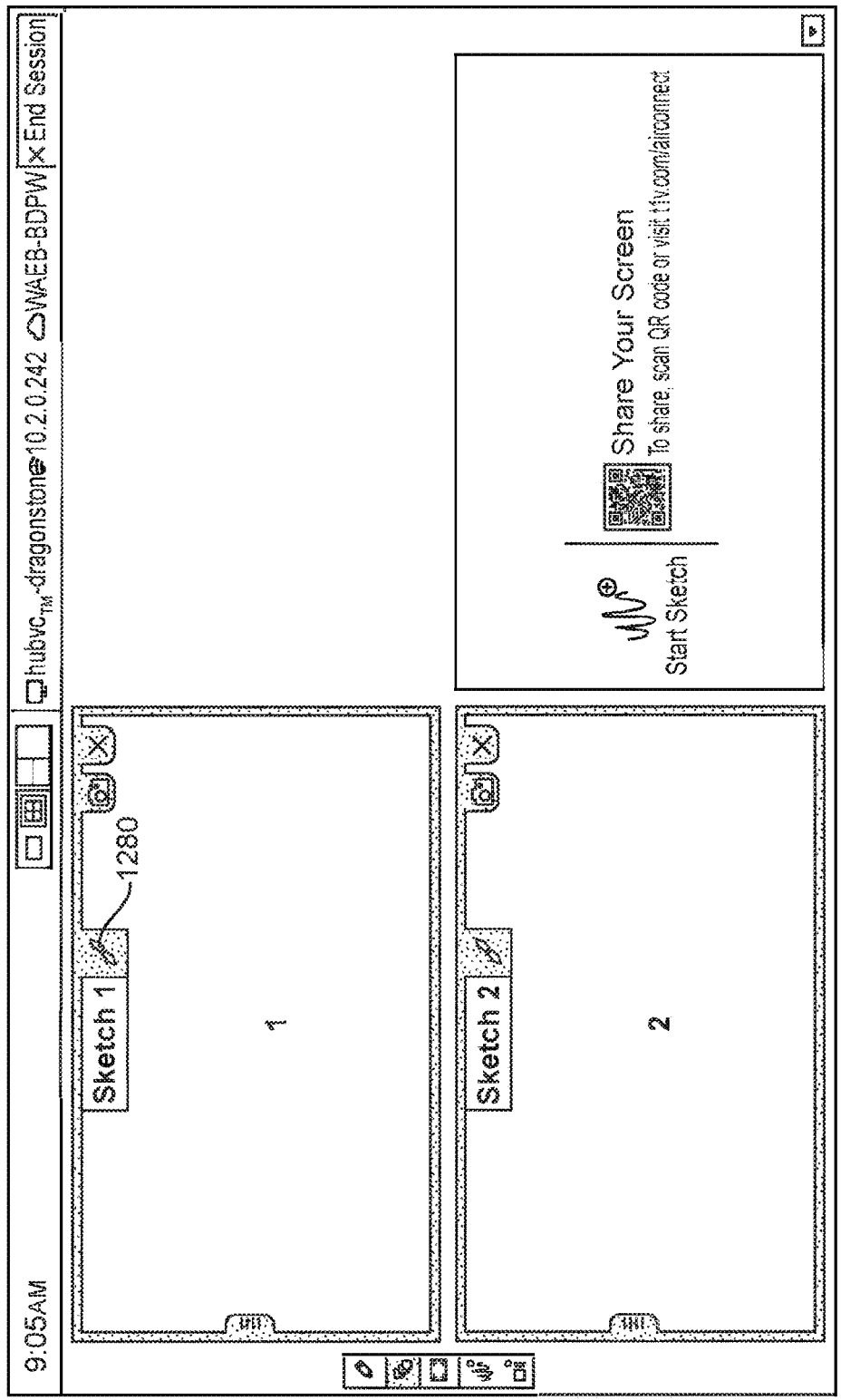
Figure 10Q:
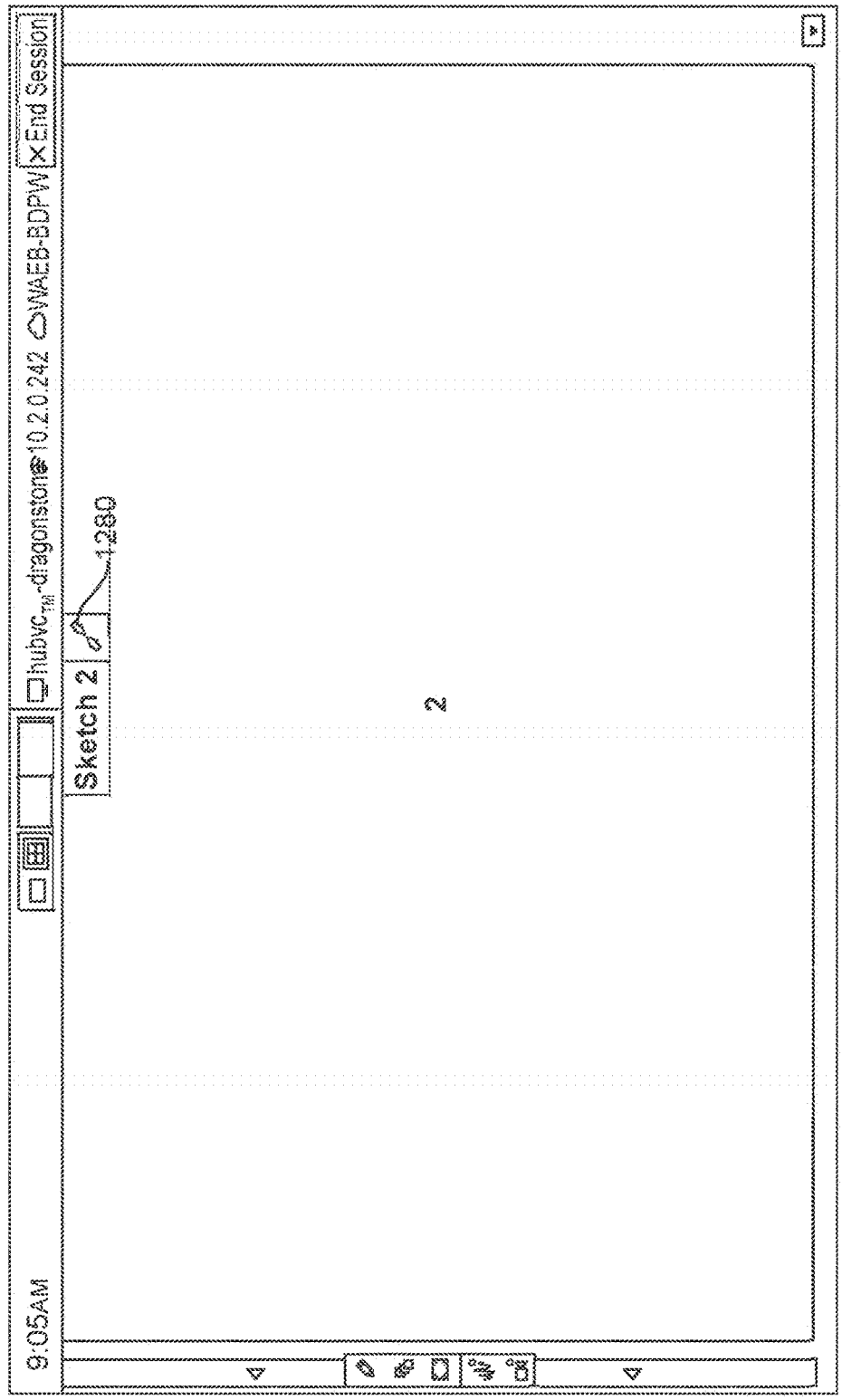
Figure 10R:
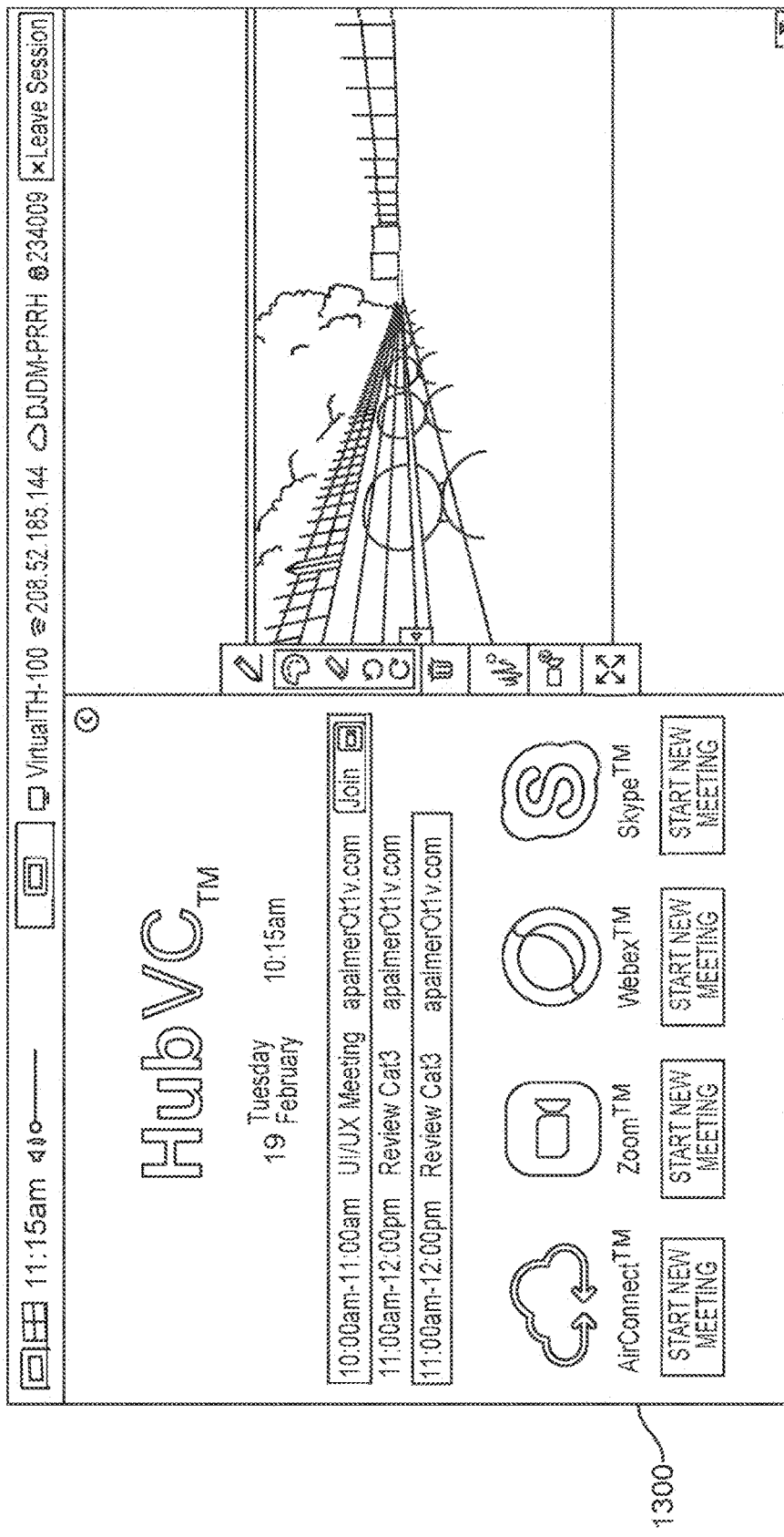
Figure 10S:
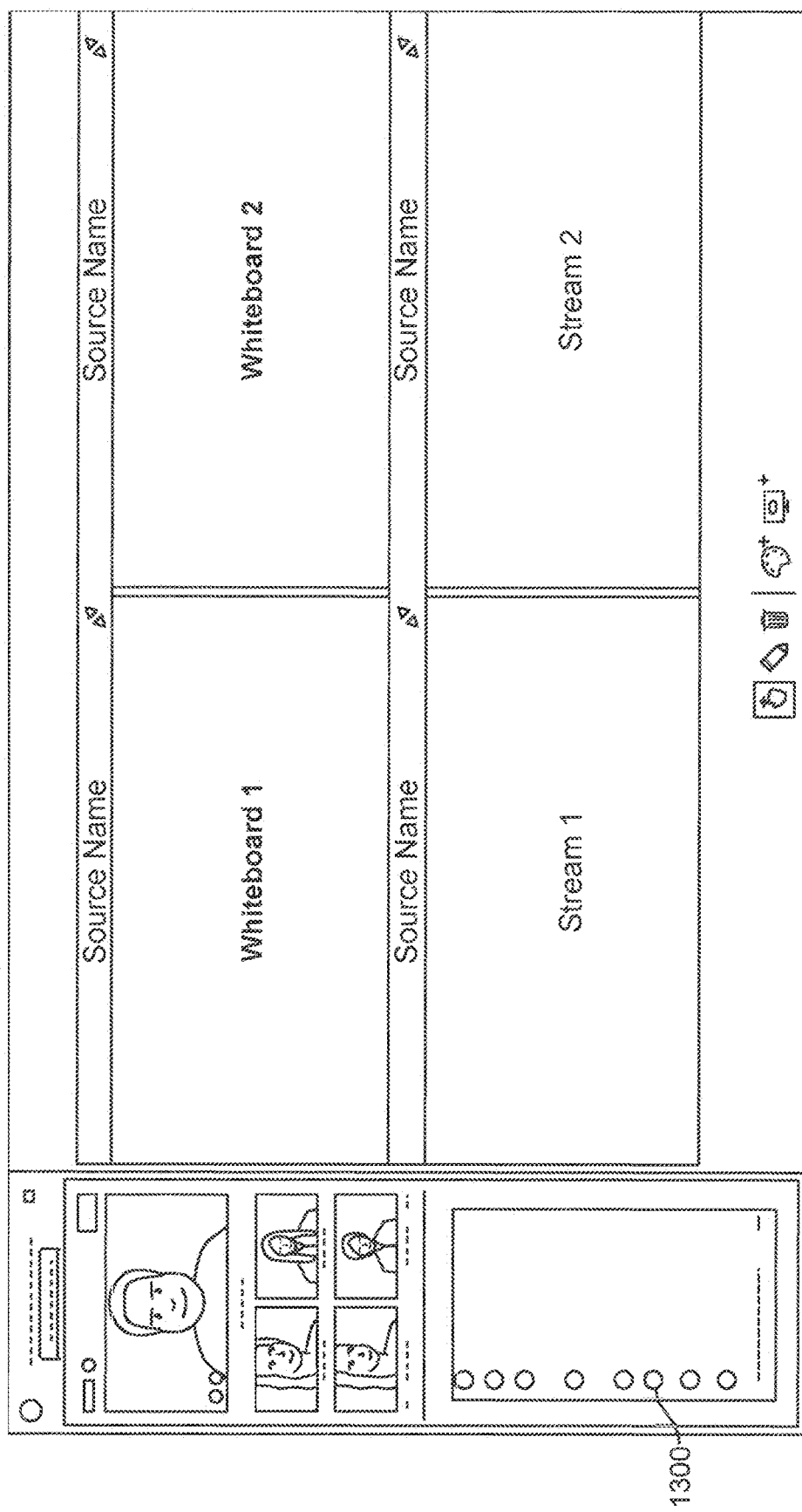
Figure 10T:
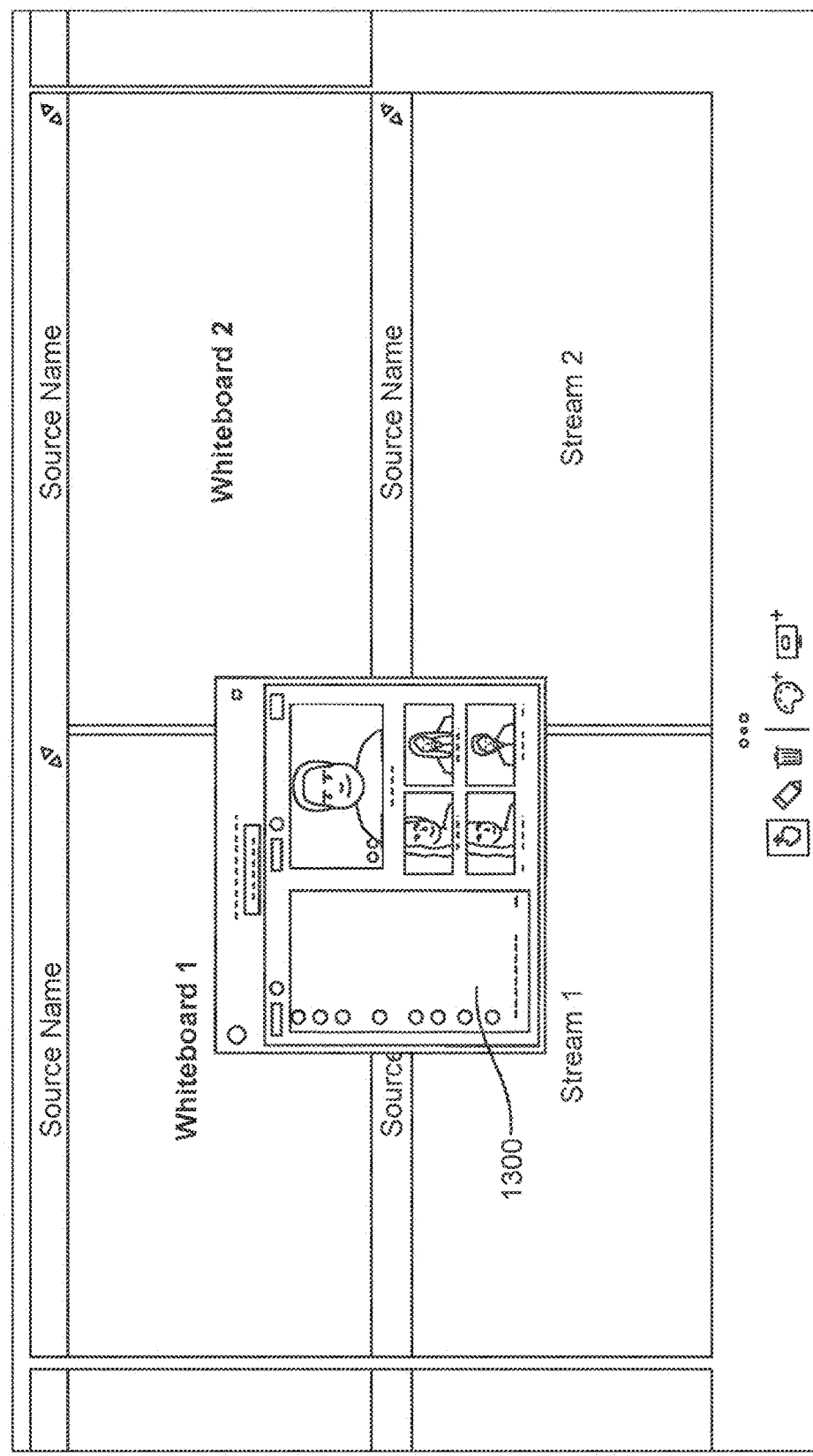
Figure 10U:
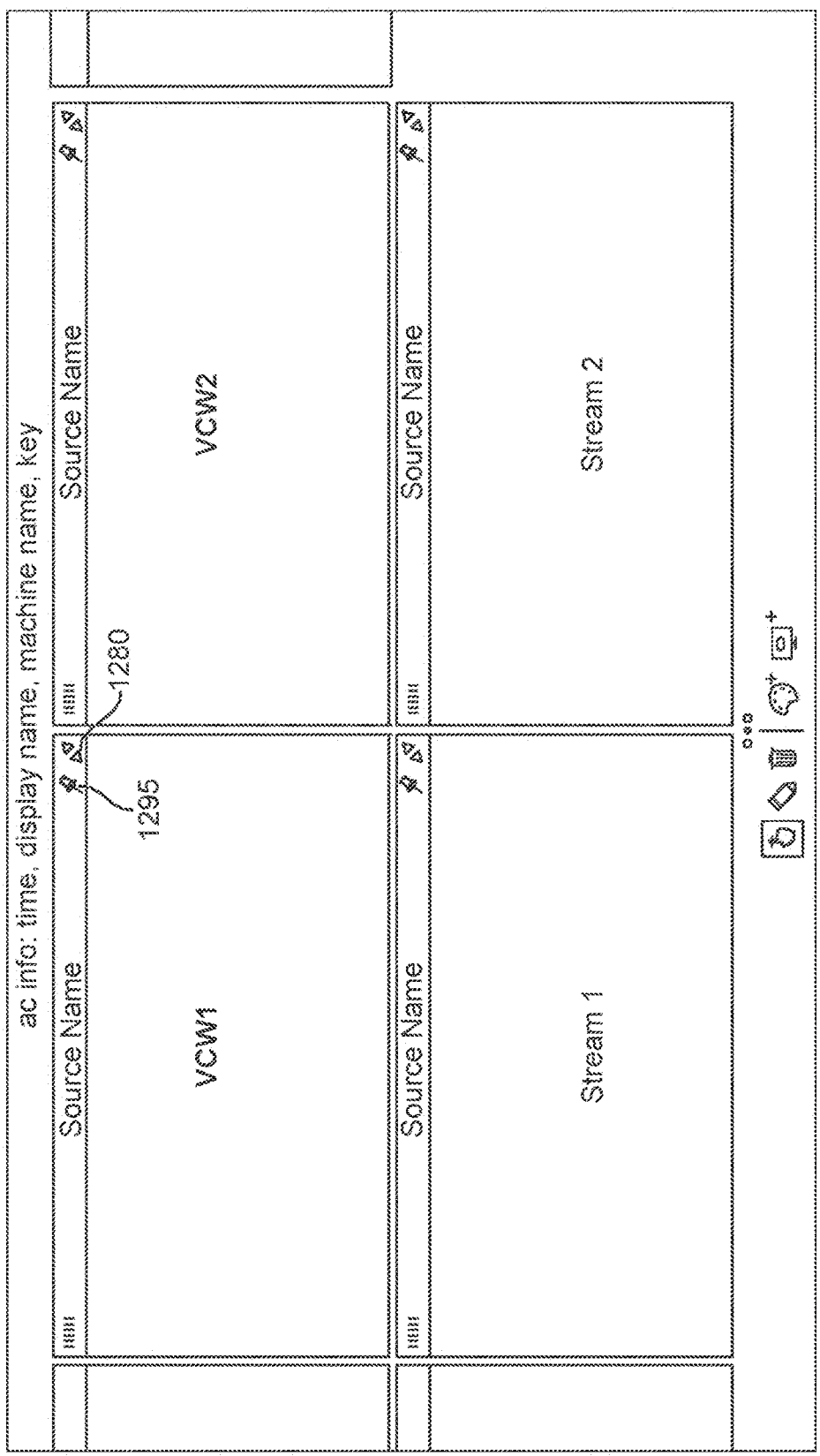

More detailed examples of operation of the restricted Virtual Canvas are illustrated in FIGS. 10A to 10U. Details of functionality of the unrestricted Virtual Canvas are disclosed in U.S. Pat. No. 9,596,319, incorporated herein by reference for all purposes. Further, any of the functions described below in connection with the restricted Virtual Canvas may be used with the first embodiment of the unrestricted Virtual Canvas. Additionally, while different configurations of the windows, control panels, display, etc., may be shown in different drawing figures, the same functionality may be provided in any of these configurations.

As may be seen in FIG. 10A, before any live streams are provided, an initial screen may be displayed that includes a white board interface 1010, video conference interfaces 1020a to 1020d, e.g., a separate interface for each supported video conferencing software, a share your screen interface 1030, e.g., a QR code to scan and a web address. A list of future or current meetings may be displayed, e.g., in a region 1050 above the interfaces.

For example, as shown in FIG. 10B, when the white board interface 1010 is selected, a whiteboard may occupy most of the screen. A control panel 1100 may be provided, e.g., at a lower portion of the screen. The control panel 1100 may include a touch mode interface 1110, an annotation mode interface 1120, a trash mode interface 1130, a whiteboard interface 1140, and a video conference interface 1150. If the annotation mode interface 1120 is selected when no windows are on the restricted Virtual Canvas, a whiteboard window may be automatically opened Each of these modes will be described below.

When a first piece of content is sent to the restricted Virtual Canvas, the restricted Virtual Canvas may be zoomed in to display only a single window containing this first piece of content (Single View), e.g., the whiteboard may be replaced by the content window, as shown in FIG. 10C. Also, as shown in FIG. 10C, a control panel 1100*a* may be provided on one side of the screen and may include the annotation mode interface 1120, the trash mode interface 1130, the whiteboard interface 1140, the video conference interface 1150, and expand to full screen interface 1160. Alternatively, the restricted canvas may be a minimum mode, whiteboard may be maintained in one of the windows and the content window in another of the fixed number of windows.

At another location on the display, e.g., a top of the display, information about the display, e.g., a name of the display 1210, an IP address 1220, and 1230. Further, other screens available on the restricted Virtual Canvas may be indicated in scroll window 1240. A leave session button 1250 will terminate the session for only the screen being displayed. A toggle icon 1260 allows the view to be toggled between a quad mode by selecting the four window icon and a single mode by selecting the single window icon, as shown.

An icon 1270 may provide an accessibility mode. When selected, all of the information that was at the top of the display is moved to the bottom of the display and the control panel 1100*a* may move from a middle of the left hand side of the display to a lower left right hand side of the display, as shown in FIG. 10D. Selecting the icon 1270 again will return to the default state shown in FIG. 10C.

When a second piece of content is added to the restricted Virtual Canvas, the view switches to a minimum view having the fixed number of windows, as shown in FIG. 10E. The remaining windows may be empty with some type of framing, may not be evident, may include whiteboards, may display the initial screen, and so forth. In an implementation, the restricted Virtual Canvas may be forced to stay in single view, with the most recently added content automatically replacing the previously displayed content.

In annotate mode, any of the whiteboards or stream may be annotated on, as shown in FIG. 10E. As shown therein, when the annotation mode interface 1120 is selected, a detailed menu 1125 related to annotation may appear.

When the video conference interface 1150 is selected, a video conferencing panel 1300 may occupy half of the screen and may include a window displaying the different video conference interfaces 1020*a* to 1020*d* to be selected, as shown in FIG. 10F. As further shown therein, the windows may be slid to the right, so that the size of the first upper left window having the stream and the lower left window having the right board are visible. The control panel 1100*a* may now be between the video conferencing panel 1300 and the windows. Selecting an end video conference interface 1320 will end all video conferences in the video conferencing panel 1300. Individual video conference windows VCW1 to VCW3 may include individual interfaces, e.g., an "x", to selectively end individual video conferences. Unlike the windows on the restricted virtual Canvas, the windows in the video conferencing panel may be freely moved and resized.

In expand to full screen mode, as shown in FIG. 10G, the individual windows may be expanded to go to edges of the display screen, i.e., without information in an upper portion being visible, as compared with FIG. 10I. Further, if the minimum mode of FIG. 10I was expanded to full screen, the gray borders there between would be eliminated as well as the upper portion. Further, this particular implementation may use a control panel 1100*b* that includes the annotation mode interface 1120, the trash mode interface 1130, a touch mode interface 1110, and the toggle icon 1260 to select the different view modes. The video conference may be controlled from the video conferencing panel 1300 as shown in FIG. 10F. Once the video conference is selected, the video conferencing panel 1300 may always be visible.

The video conferencing panel 1300 may be expanded up to a certain portion of the screen, e.g., half of the screen, as shown in FIG. 10H. This may be done by dragging the video conferencing panel 1300 or using an expand button. When in single view mode of FIG. 10H, the aspect ratio of the window may be maintained, such that a portion below the window is empty. Thumbnails of other windows may be shown therein. These may not be updated in real time, reducing the burden.

In touch mode, the windows may be rearranged, as shown in FIGS. 10I to 10K, or a window off to the side may replace one of the windows being displayed, as shown in FIGS. 10L to 10M. For simplification, the scrolling between windows may be along a single dimension, e.g., laterally, e.g., left and right as shown here, or vertically, e.g., up and down. In other words, the minimum mode may have the windows arranged in a matrix of x rows and y columns, wherein each of x and y are 2 or greater, one of x and y being fixed, e.g., to two, and another of x and y is larger, e.g., unlimited.

In the delete mode, as shown in FIG. 10N, each window being displayed may be provided with a delete button so that one or more of these windows may be deleted. Also, as may be seen in FIG. 10N, edges of screens adjacent to those being viewed may be seen off to respective sides.

In an implementation shown in FIGS. 10O and 10P, instead of a simple delete mode, a control panel 1100*c* may include an edit mode interface 1180 may be provided, which may include dragging as well as deleting and taking a snapshot when that mode is selected as shown in FIG. 10P. As also shown in FIGS. 10O to 10Q, each window may include a toggle interface 1280 to switch between the minimum mode display of FIGS. 10O and 10P to the single display mode of FIG. 10Q and back again.

Referring again to FIGS. 10E and 10F, a useful function to have on both the unrestricted and restricted Virtual Canvases is a snapshot function. This is particularly useful for a live stream (e.g. a lap top feed, a web browser, etc.). Selecting a snapshot function using the snapshot icon 1290 in each window in a particular first window on the restricted Virtual Canvas would produce a snapshot in a second window of the instantaneous view of the content of the first window. The snapshot in the second window would then be a static image, so that even if the first window changes, the second window would remain with the same static image. The second window would then also have all of the options available in the other windows, including the ability to annotate on top of the snapshot. When a snapshot is taken in the unrestricted Virtual Canvas, the snapshot may correspond to the size of the object and may be independently moved and resized, as any other object in the unrestricted Virtual Canvas.

As illustrated in FIG. 10R, when one of the video conference interfaces is selected, a video conferencing panel

1300 may occupy a fixed portion of the display, e.g., half of the screen. Here, the control panel 1100*a* may be between the video conferencing panel 1300 and remaining windows e.g., two windows that are maintained in the minimum mode size. In an implementation, as shown in FIG. 10M, a position of the control panel 1100*a* may remain unchanged. The video conferencing panel 1300 may include the video conference interfaces 1020*a* to 1020*d* to allow a user to select which VC provider to be used, e.g., a native AirConnect™ or third party video conferencing software, e.g., Zoom™, Skype™, WebEx®, and so on. When the video conferencing panel 1300 occupies half of the screen, only a subset of the windows, e.g., two, of the windows in minimum mode may be viewed, so the size thereof is not reduced. When in single mode, the window will be reduced to occupy half of the screen.

Alternatively, the video conferencing panel 1300 may occupy a smaller fixed portion of the display, as shown in FIG. 10S. When the video conferencing panel VCP occupies less than a predetermined amount of the screen, e.g., a quarter of the screen, the windows in the minimum mode may be slightly reduced or a right most edge of the right most windows may be cropped. When the video conferencing panel VCP occupies more than the predetermined amount of the screen, only two of the windows may be shown.

As a further alternative, as shown in FIS. 10T, the video conferencing panel 1300 may be resizeable and movable and remains on top of the windows. Thus, in all of these, the video conferencing panel 1300 is not part of the restricted Virtual Canvas.

As a further alternative, as shown in FIG. 10U, unlike video conferencing on an unrestricted Virtual Canvas, as described above, since the number of windows in view is fixed, the video conference may occupy a predetermined window of the windows in minimum mode, e.g.,VCW1 and VCW2. VCW1 may show the stream being output from common display computer and VCW2 may be a stream output from a remote computer. Unlike the video display panel discussed above, only a single video conference stream may be displayed in each window. Since windows on the restricted Virtual Canvas cannot be zoomed in and out, like in the Virtual Canvas, one of the windows may be readily used for the video conference. Further, while the video conference windows be moved, annotated or otherwise treated like any other window, the windows shown in FIG. 10U may include, in addition to the toggle interface 1280, a pin interface 1295 that prevents the position of the window from moving even when other windows are scrolled. When the pin interface 1295 is selected, that window, e.g., VCW2, may stay in view.

Embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of this disclosure.

The methods and processes described herein may be performed by code or instructions to be executed by a computer, processor, manager, or controller. Because the algorithms that form the basis of the methods (or operations of the computer, processor, or controller) are described in detail, the code or instructions for implementing the operations of the method embodiments may transform the computer, processor, or controller into a special-purpose processor for performing the methods described herein.

Also, another embodiment may include a computer-readable medium, e.g., a non-transitory computer-readable medium, for storing the code or instructions described above. The computer-readable medium may be a volatile or non-volatile memory or other storage device, which may be removably or fixedly coupled to the computer, processor, or controller which is to execute the code or instructions for performing the method embodiments described herein.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A method of collaborating between a first computer associated with a first display at a first location and a second computer associated with a second display at a second location, the method comprising:
    establishing a connection between the first and second computers;
    opening a virtual canvas on the first computer, the virtual canvas to be displayed on the first and second displays simultaneously; and
    sending an object between the first and second computers by sending data associated with the object on the virtual canvas stored on the first computer from the first computer to the second computer to be stored locally, thereby creating a shared canvas, wherein objects are at a single location on the shared canvas,
    sending a first live video stream from the first display to the second display to be viewed in a first video conference window separate from the virtual canvas on the second display, and
    sending a second live video stream from the second display to the first display to be viewed in a second video conference window separate from the virtual canvas on the first display.

2. The method as claimed in claim 1, further comprising connecting a mobile display device to one of the first and second computers, sending a rendering of the shared canvas, and directly sending the first and second live video streams in a video conference window on the mobile display device separate from the rendering.

3. The method as claimed in claim 1, wherein each of the first and second video conference windows is in a video conferencing panel.

4. The method as claimed in claim 3, further comprising:
selecting a video conference window; and
altering the selected video conference window.

5. The method as claimed in claim 4, wherein altering the selected video conference window includes moving the selected video conference window to be adjacent a camera on a display viewing the window.

6. The method as claimed in claim 4, wherein altering the selected video conference window includes enlarging the window.

7. The method as claimed in claim 4, selecting the video conference window includes detecting an audio signal associated with the video conference window.

8. The method as claimed in claim 3, wherein the video conferencing panel is stationary and the at least two video conference windows are manipulatable.

9. The method as claimed in claim 1, wherein first and second video conference windows are stationary, and the shared canvas and objects thereon are manipulatable.

10. The method as claimed in claim 9, wherein each of the first and second video conference windows are adjacent a camera associated with a display on which respective video conference windows are viewed.

11. The method as claimed in claim 9, wherein the video conference window is in a periphery of a display on which respective video conference windows are viewed.

12. The method as claimed in claim 1, wherein the connection for the virtual canvas provides information needed to send the first and second live video streams.

13. The method as claimed in claim 1, wherein the connection for the virtual canvas provides information to send the first and second live video streams.

14. The method as claimed in claim 1, wherein the virtual canvas is stored in the cloud and the first and second live video streams are transmitted in real-time.

15. The method as claimed in claim 1, wherein the virtual canvas is a restricted virtual canvas.

16. The method as claimed in claim 1, wherein:
the first live video stream is displayed in the second video conference window separate from the virtual canvas on the first display, and
the second live video stream is displayed in the first video conference window separate from the virtual canvas on the second display.

17. A method of collaborating between first and second mobile devices having sharing application downloaded thereon and a host computer, the second mobile device being remote from the first mobile device and the host computer, the method comprising:
establishing a peer-to-peer connection between the first and second mobile devices and the host computer;
opening a virtual canvas on the host computer having a host display, the virtual canvas to be shared by the first and second mobile devices and the host display;
sending a first object from the first mobile device to the virtual canvas by sending data associated with the first object to the host computer and sending the first object to the second mobile device by sending data associated with the first object from the host computer to the second mobile device;
sending a first live video stream from the first mobile device to the host device to be viewed in a first video conference window separate from the virtual canvas on the host display, and
sending a second live video stream from the second mobile device to the first mobile device to be the host device to be viewed in a second video conference window separate from the virtual canvas on the host display.

18. The method as claimed in claim 17, wherein the virtual canvas is stored in the cloud.

19. The method as claimed in claim 17, wherein collaboration is to include a second host computer having a second host display located near the second mobile device, the method further comprising:
establishing a peer-to-peer connection between the host computer and the second host computer, wherein the virtual canvas to be displayed on the first and second displays simultaneously; and
displaying the first and second live video streams on the second host display in first and second windows separate from the virtual canvas.

20. The method as claimed in claim 17, wherein sending the first and second live video streams includes using user accounts associated with the first and second mobile devices.

21. The method as claimed in claim 17, wherein establishing the peer-to-peer connection includes:
generating a key by the host device,
reading the key by the first mobile device;
sending the key to the second mobile device, and
entering the key into the second mobile device.

22. A method of collaborating between a first computer associated with a first display at a first location and a second computer associated with a second display at a second location, the method comprising:
establishing a connection between the first and second computers;
opening a virtual canvas on the first computer, the virtual canvas to be displayed on the first and second displays simultaneously; and
sending an object between the first and second computers by sending data associated with the object on the virtual canvas stored on the first computer from the first computer to the second computer to be stored locally, thereby creating a shared canvas, wherein objects are at a single location on the shared canvas,
sending a first live video stream from the first display to the second display to be viewed in a first video conference window on the second display, and
sending a second live video stream from the second display to the first display to be viewed in a second video conference window on the first display, wherein at least one of the first and second video conference windows is not on the virtual canvas.

* * * * *